United States Patent
Kliewer et al.

(10) Patent No.: US 10,153,892 B2
(45) Date of Patent: Dec. 11, 2018

(54) ASYNCHRONOUS WIRELESS SENSING

(71) Applicants: New Jersey Institute of Technology, Newark, NJ (US); Arrowhead Center—New Mexico State University, Las Cruces, NM (US)

(72) Inventors: Joerg Kliewer, Fair Lawn, NJ (US); Wei Tang, Las Cruces, NM (US)

(73) Assignees: New Jersey Institute of Technology, Newark, NJ (US); Arrowhead Center—New Mexico State University, Las Cruces, NM (US)

( * ) Notice: Subject to any disclaimer, the term of this patent is extended or adjusted under 35 U.S.C. 154(b) by 0 days.

(21) Appl. No.: 15/651,665

(22) Filed: Jul. 17, 2017

(65) Prior Publication Data
US 2018/0019862 A1    Jan. 18, 2018

Related U.S. Application Data

(60) Provisional application No. 62/362,700, filed on Jul. 15, 2016.

(51) Int. Cl.
*H04L 25/38* (2006.01)
*H04L 7/00* (2006.01)
(Continued)

(52) U.S. Cl.
CPC ............. *H04L 7/0016* (2013.01); *G01D 4/00* (2013.01); *H04L 1/005* (2013.01); *H04L 1/0041* (2013.01);
(Continued)

(58) Field of Classification Search
CPC ..... H04L 7/0016; H04L 7/0008; H04L 27/12; H04L 1/0055; H04L 1/203; H04L 1/0052
See application file for complete search history.

(56) References Cited

U.S. PATENT DOCUMENTS

| | | | | | |
|---|---|---|---|---|---|
| 6,157,689 | A | * | 12/2000 | Petty | G06F 13/385 375/222 |
| 2005/0031055 | A1 | * | 2/2005 | Ernst | H04L 25/068 375/342 |

(Continued)

OTHER PUBLICATIONS

Bahl, et al., "Optimal decoding of linear codes for minimizing symbol error rate," IEEE Trans. Inf. Theory, vol. 20, No. 2, pp. 284-287, Mar. 1974.

(Continued)

*Primary Examiner* — Dac Ha
(74) *Attorney, Agent, or Firm* — Lerner, David, Littenberg, Krumholz & Mentlik, LLP

(57) ABSTRACT

Low-complexity asynchronous wireless sensing and communication architecture is disclosed for low power wireless sensors. Schemes are based on asynchronous digital communications and Ultra-Wideband impulse radios. In asynchronous radio, combination of frequency-shift-keying (FSK) and on-off-keying (OOK) to remove clock synchronization is applied. Improved asynchronous non-coherent transmitters and receivers achieve both low power and low complexity while seamlessly combined with asynchronous level-crossing modulation. Both uncoded and coded asynchronous communication may be utilized. Coded asynchronous communication may use error correction. Forward error correction schemes for asynchronous sensor communication are utilized where dominant errors consist of pulse deletions and insertions, and where instantaneous encoding takes place. Forward error correction is also accomplished where a continuous-time sparse waveform signal is asynchronously sampled and communicated over a noisy channel via Q-ary frequency-shift keying. Concatenated code employs outer systematic convolutional codes and inner embedded marker codes that preserve timing information and protect against symbol insertions and deletions.

22 Claims, 13 Drawing Sheets

(51) Int. Cl.
| | |
|---|---|
| H04L 27/12 | (2006.01) |
| H04L 1/00 | (2006.01) |
| H04L 1/20 | (2006.01) |
| G01D 4/00 | (2006.01) |

(52) U.S. Cl.
CPC .......... *H04L 1/0047* (2013.01); *H04L 1/0052* (2013.01); *H04L 1/0055* (2013.01); *H04L 1/203* (2013.01); *H04L 7/0008* (2013.01); *H04L 27/12* (2013.01)

(56) References Cited

U.S. PATENT DOCUMENTS

| | | | |
|---|---|---|---|
| 2011/0063094 A1* | 3/2011 | Meiertoberens ..... | A61B 5/0002 340/12.5 |
| 2011/0074552 A1* | 3/2011 | Norair ................. | G06K 7/0008 340/10.1 |

OTHER PUBLICATIONS

Benedetto, et al., "Serial concatenation of interleaved codes: Performance analysis, design, and iterative decoding," IEEE Transactions on information Theory, vol. 44, No. 3, pp. 909-926, May 1998.
Chaparro, et al., "Asynchronous representation and processing of nonstationary signals: A time-frequency framework," IEEE Signal Processing Magazine, vol. 30, No. 6, Nov. 2013, pp. 42-52.
Chen, et al., "Concatenated codes for deletion channels," in Proc. IEEE Int. Sympos. on Inform. Theory, Yokohama, Japan, Jun. 2003, pp. 218-218.
Davey, et al., "Reliable communication over channels with insertions, deletions, and substitutions," IEEE Trans. Inf. Theory, vol. 47, No. 2, pp. 687-698, Feb. 2001.
Foerster, et al., "Ultra-wideband technology for short- or medium-range wireless communications," Intel Technology Journal, vol. 5, No. 2, pp. 1-11, May 2001.
Gungor, et al. "Industrial wireless sensor networks: Challenges, design principles, and technical approaches," IEEE Trans. On Industrial Electronics, vol. 56, No. 10, pp. 4258-4265, Oct. 2009.
Hu, et al., "Asynchonous communication for wireless sensors using ultra-wideband impulse radio," in IEEE 58th International Midwest Symposium on Circuits and Systems, Fort Collins, CO, Aug. 2015, pp. 1-4.
Mansour and A. H. Tewrik, "Convolutional decoding in the presence of synchronization errors," IEEE J. Sel. Areas in Commun., vol. 28, No. 3, pp. 218-227, Feb. 2010.
Mercier et al., "Convolutional codes for channels with deletion errors," in Proc. 11th Canadian Workshop on Information Theory, May 2009, pp. 136-139.
Schell, et al., "A continuous-time ADC/DSP/DAC system with no clock and with activity-dependent power dissipation," IEEE Journ. of Solid-State Circ., vol. 43, No. 11, Nov. 2008, pp. 2472-2481.
Sloane, "On Single-Deletion-Correction Codes," in Codes and Designs. Berlin: Walter de Gruyter, May 2000, pp. 273-291.
Tropp, et al., "Beyond Nyquist: Efficient sampling of sparse bandlimited signals," IEEE Trans. Inf. Theory, vol. 56, No. 1, pp. 520-544, Jan. 2010.
Wang, et al., "On capacity and coding for segmented deletion channels," in Proc. 49th Annual Allerton Conference on Communication, Control, and Computing, Monticello, IL, Sep. 2011, pp. 1408-1413.
Wang, et al., "Symbol-level synchronization and LDPC code design for insertion/deletion channels," IEEE Trans. Comm., vol. 59, No. 5, pp. 1287-1297, May 2011.
Willig, "Recent and emerging topics in wireless industrial communications: A selection," IEEE Transactions on Industrial Informatics, vol. 4, No. 2, pp. 102-124, May 2008.
Yi et al., "Error correction for asynchronous communication," in IEEE 9th International Symposium on Turbo Codes and Iterative Information Processing (ISTC), Brest, France, Sep. 2016, pp. 310-314.
Dokania, R.J. et al., "A Low Power Impulse Radio Design for Body-Area-Networks," IEEE Transactions on Circuits and Systems-I: Regular Papers, vol. 58, No. 7, Jul. 2011, pp. 1458-1469.
Zheng, Y. et al., "A CMOS Carrier-less UWB Transceiver for WPAN Applications," ISSCC 2006/Session 6/UWB Transceivers/6.2; 2006 IEEE International Solid-State Circuits Conference, Feb. 6, 2006, pp. 1-10.
Crepaldi, M. et al., "An Ultra-Wideband Impulse-Radio Transceiver Chipset Using Synchronized-OOK Modulation," IEEE Journal of Solid-State Circuits, vol. 46, No. 10, Oct. 2011, pp. 2284-2299.
Tang W. et al., "Live demonstration: A FSK-OOK ultra wideband impulse radio system with spontaneous clock and data recovery." InCircuits and Systems (ISCAS), 2012 IEEE International Symposium on May 20, 2012 (pp. 696-700). IEEE.
Inose, H., et al., "Asynchronous Delta-Modulation System", Electronics Letters, Mar. 1966, pp. 95-96, vol. 2, No. 2, IET, USA. (Abstract Only).
O'Driscoll, Stephen, et al., "Adaptive resolution ADC array for neural implant," in 2009 Annual International Conference of the IEEE Engineering in Medicine and Biology Society, Sep. 2009, pp. 1053-1056, USA. (Abstract Only).
Harris, John, et al., "Pulse-based signal compression for implanted neural recording systems," Proceedings of 2008 IEEE International Symposium on Circuits and Systems, Jun. 2008, pp. 344-347, IEEE, Seattle, USA. (Abstract Only).
Trakimas, Michael, et al., "An adaptive resolution asynchronous ADC architecture for data compression in energy constrained sensing applications," in IEEE Transactions on Circuits and Systems I: Regular Papers, Dec. 2010, pp. 921-993, vol. 58, No. 5, USA. (Abstract Only).
Fesquet, Laurent, et al., "Targeting ultra-low power consumption with non-uniform sampling and filtering," in Proceedings of 2010 IEEE International Symposium on Circuits and Systems (ISCAS), Aug. 2010, pp. 3585-3588, IEEE, France. (Abstract Only).
Kozmin, Kirill, et al., "Level-crossing ADC performance evaluation toward ultrasound application," in IEEE Transactions on Circuits and Systems I: Regular Papers, Dec. 2008, pp. 1708-1719, vol. 56, No. 8, IEEE. (Abstract Only).
Wang, Tunde, et al., "A level-crossing analog-to-digital converter with triangular dither," in IEEE Transactions on Circuits and Systems I: Regular Papers, Sep. 2009, pp. 2089-2099, vol. 56, No. 9, IEEE. (Abstract Only).

\* cited by examiner

| Transmitters | ISLPED2010 [13] | TVLSI2012 [3] | This Work |
|---|---|---|---|
| Process | 90nm CMOS | 0.5μm CMOS | 0.18μm CMOS |
| Bandwidth | 3~5GHz | 0~3GHz | 240~960MHz |
| Data Rate | 5Mbit/sec | 1.3Mbit/sec | 5Mbit/sec |
| Power | 0.145mW | 15mW | 10.8mW |

| Receivers | RFIT2012 [14] | RFIC2012 [15] | This Work |
|---|---|---|---|
| Process | 90nm CMOS | 65nmμm CMOS | 0.18μm CMOS |
| Bandwidth | 3.5~4GHz | 3~5GHz | 200MHz~1GHz |
| Data Rate | 100kbit/sec | 1Mbit/sec | 2.3Mbit/sec |
| Power | 3.8mW | 0.45mW | 5.4mW |

CODE RATES AND PUNCTURING SCHEMES FOR THE EMPLOYED SYSTEMATIC CONVOLUTIONAL CODES

| R | Generator | Puncturing matrix | $R_c$ | Label | $N_s$ | $R_c(Q=4)$ | $R_c(Q=8)$ |
|---|---|---|---|---|---|---|---|
| $\frac{2}{3}$ | $G(D) = \begin{bmatrix} 1 & 0 & (D^2+D+1)/(D^3+D^2+D+1) \\ 0 & 1 & (D^3+D+1)/(D^3+D^2+D+1) \end{bmatrix}$ | — | $\frac{2}{3}$ | cc23 | 2 | $\frac{1}{3}$ | $\frac{4}{9}$ |
| $\frac{1}{2}$ | $G(D) = \begin{bmatrix} 1 & (D^2+D+1) \end{bmatrix}$ | — | $\frac{1}{2}$ | cc12 | 0 | — | $\frac{1}{3}$ |
| $\frac{1}{2}$ | $G(D) = \begin{bmatrix} 1 & (D^2+D+1) \end{bmatrix}$ | $\begin{bmatrix} 1 & 1 & 1 \\ 1 & 1 & 0 \end{bmatrix}$ | $\frac{3}{5}$ | cc35 | 4 | $\frac{2}{5}$ | $\frac{2}{5}$ |
| $\frac{1}{2}$ | $G(D) = \begin{bmatrix} 1 & (D^2+D+1) \end{bmatrix}$ | $\begin{bmatrix} 1 & 1 & 1 & 1 & 1 \\ 1 & 1 & 0 & 1 & 1 \end{bmatrix}$ | $\frac{5}{9}$ | cc59 | 8 | $\frac{5}{18}$ | $\frac{5}{18}$ |

Fig. 27

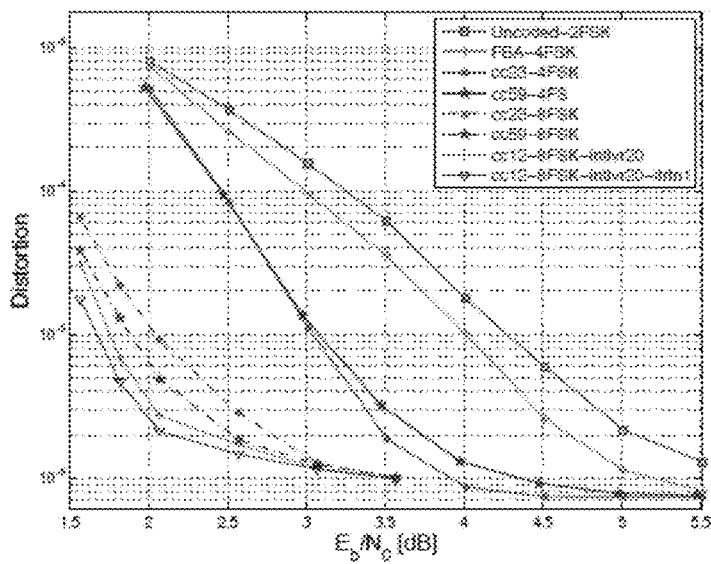

ASYNCHRONOUS WIRELESS SENSING

CROSS-REFERENCE TO RELATED APPLICATION

The present application claims the benefit of the filing date of U.S. Provisional Patent Application No. 62/362,700, filed Jul. 15, 2016, the disclosure of which is hereby incorporated herein by reference.

GOVERNMENT LICENSE RIGHTS

This invention was made with government support under contract ECCS-1407910 awarded by a grant from the U.S. National Science Foundation. The government has certain rights in the invention.

FIELD OF USE

The present application discloses a wireless sensor network that seamlessly combines asynchronous sensing and asynchronous wireless communications. More particularly, the present application relates to a complete asynchronous wireless sensing architecture that contains a front-end asynchronous signal interface and a backend asynchronous wireless interface and eliminates use of a clock at the transmitter.

BACKGROUND OF THE INVENTION

Currently there is a growing demand for low power small-size wireless sensors used in many applications such as environmental observation, biomedical signal monitoring, and security surveillance systems. Since such applications require a wireless sensor operating in "always-on" mode, the increased data rate and limited power constraint of the sensor are significant design challenges. For example, the battery of a surveillance wireless image sensor needs to be replaced every two days. This power-and-speed trade-off limits such sensors to be deployed in the field.

Asynchronous sensing becomes attractive to solve some of the above problems. In most of the "always-on" monitoring applications, the input signal is sparse or pulse-based, while only the rapid variation of the signal is of interest. A conventional architecture with a constant sampling rate generates a large amount of null data and wastes considerable energy when sensing a sparse signal. In contrast, asynchronous sensing generates a trigger pulse only when the input amplitude crosses a set of predefined thresholds and therefore converts the analog input signal into asynchronous digital pulse sequences. Many conventional asynchronous sensing systems have been investigated in the past but have been met with very limited success and have many drawbacks.

In 1966, asynchronous sensing was first proposed by H. Inose, T. Aoki, and K. Watanabe that coined the name "asynchronous delta modulation." ["Asynchronous delta-modulation system," in Electronics Letters, vol. 2, no. 3, pp. 95-96, 1966]. Other investigators based on this approach of asynchronous delta modulation, have proposed variable resolution analog-digital converters (ADCs). [S. O'Driscoll and T. Meng, "Adaptive resolution ADC array for neural implant," in 2009 Annual International Conference of the IEEE Engineering in Medicine and Biology Society, pp. 1053-1056, 2009], and integration pulse-based asynchronous ADCs [J. Harris, J. Principe, J. Sanchez, D. Chen, and C. She, "Pulse-based signal compression for implanted neural recording systems," in Proceedings of 2008 IEEE International Symposium on Circuits and Systems, pp. 344-347, 2008], and level crossing sampling ADCs [M. Trakimas and S. Sonkusale, "An adaptive resolution asynchronous ADC architecture for data compression in energy constrained sensing applications," in IEEE Transactions on Circuits and Systems I: Regular Papers, vol. 58, no. 5, pp. 921-934, 2011].

Attempts to understand the fundamental principle of asynchronous sampling have also been previously reported. [L. Fesquet, G. Sicard, and B. Bidandgaray-Fesquet, "Targeting ultra-low power consumption with non-uniform sampling and filtering," in Proceedings of 2010 IEEE International Symposium on Circuits and Systems (ISCAS), pp. 3585-3588, 2010]. Later, applications related to ultrasound and audio/ECG recording have been investigated by K. Kozmin, J. Johansson, and J. Delsing ["Level-crossing ADC performance evaluation toward ultrasound application," in IEEE Transactions on Circuits and Systems I: Regular Papers, vol. 56, no. 8, pp. 1708-1719, 2009]; and T. Wang, D. Wang, P. Hurst, B. Levy, and S. Lewis. ["A level-crossing analog-to-digital converter with triangular dither," in IEEE Transactions on Circuits and Systems I: Regular Papers, vol. 56, no. 9, pp. 2089-2099, 2009.].

Investigators B. Schell and Y. Tsividis found that the power saving advantage of asynchronous sensing generally lies in the fact that if an input signal is inactive or no changes are detected, then no sampling and transmission is made and energy is saved. ["A continuous-time ADC/DSP/DAC system with no clock and with activity-dependent power dissipation," in IEEE Journal of Solid-State Circuits, vol. 43, no. 11, pp. 2472-2481, 2008].

One drawback to all the above previous asynchronous sensing methods is that current methodologies do not implement wireless communication radio devices. In order to implement wireless sensing, sensors and radios must be seamlessly combined. Nonetheless, current prevalent synchronous wireless communication devices cannot match the asynchronous sensing front-end because synchronous digital radio interfaces require clocked data packets and thus must be redesigned to enable an asynchronous operation. Furthermore, asynchronous radios require wideband carriers that are not well suited for narrow-band radio applications.

Ultra-Wideband impulse radio (UWB-IR) is a competitive candidate for asynchronous radio. However, previous UWB impulse radios require external synchronizers or internal delay locked loops (DLL) that require more energy than without such elements. [see, R. Dokania, X. Wang, S. Tallur, and A. Apsel, "A low power impulse radio design for body-area networks," in IEEE Transactions on Circuits and Systems I: Regular Papers, vol. 58, no. 7, pp. 1458-1469, 2011; and Y. Zheng, Y. Tong, C. W. Ang, Y.-P. Xu, W. G. Yeoh, F. Lin, and R. Singh, "A CMOS carrier-less UWB transceiver for WPAN applications," in Digest of Technical Papers, IEEE International Solid-State Circuits Conference, pp. 378-387, 2006].

Furthermore, use of a self-synchronized OOK (on-off-keying) and also applied DLLs have the drawback of constantly consuming energy even when there is no data transmission. [M. Crepaldi, C. Li, J. Fernandes, and P. Kinget, "An ultra-wideband impulse-radio transceiver chipset using synchronized-OOK modulation," in IEEE Journal of Solid-State Circuits, vol. 46, no. 10, pp. 2284-2299, 2011].

Therefore there still exists a critical need for a low-complexity low-power wireless sensor architecture capable of providing reliable high data-rate transmission over a noisy communication link.

SUMMARY OF THE INVENTION

Compared to the above methods the presently disclosed asynchronous technique completely removes the clock circuitry, which improves energy efficiency and effective data rate, and ultimately solves clock synchronization problems, while reducing bit-error-rate (BER) by eliminating effects from clock jitters. Moreover, compared to previous attempts, the invention offers high-speed data communication since there is no global worst-case latency. Furthermore, the present invention reduces electromagnetic noise emissions from the clock, which is particularly helpful in medical applications.

The invention utilizes and seamlessly combines asynchronous sensing and asynchronous wireless communications to form a complete asynchronous wireless sensing architecture without a clock at the transmitter. By incorporating a front-end asynchronous signal interface and a backend asynchronous wireless interface, the front-end asynchronous signal interface converts an input analog signal into two asynchronous digital pulse streams. In the signal interface, two thresholds are predefined as boundaries of a reference window. The input signal is then compared with the window boundaries. When the signal exceeds either of the boundaries, an output pulse is generated indicating whether the signal is higher or lower than the thresholds. In the meantime, the reference window will shift up or down by a predefined step to prepare the next sampling event. During this process the generated positive and negative pulse streams are the output of the asynchronous signal interface.

The present invention's proposed asynchronous wireless interface uses two separate transmitters with FSK (frequency-shift-keying)-OOK (on-off-keying) modulation to send the positive and negative pulses. Each transmitter consists of a ring oscillator with an input stage, a multiplexer chain, and a power amplifier. The baseband data is sent to the input stage, which performs OOK. The ring oscillator generates RF (radio-frequency) carriers. The frequency of the RF carrier is controlled by a multiplexer chain, which performs FSK. The RF impulse is delivered to a power amplifier that drives the transmitter antenna. The receiver collects timing information of the received positive and negative pulse streams and recovers the original input signal. Another advantage of the present invention is that it is well suited to low power always-on wireless sensors with sparse input signals.

The invention may further utilize an asynchronous integrated Ultra-Wideband (UWB) impulse radio transmitter and receiver suitable for low-power miniaturized wireless sensors. Asynchronous transmission over noisy channels using FSK-OOK modulation of the present invention demonstrate that the proposed architecture is capable to communicate reliably at moderate signal-to-noise ratios and that main errors are due to deletions of received noisy transmit pulses. Depending on the implementation, a hardware chip of the integrated UWB transmitter and receiver may be fabricated using an IBM 0.18 µm CMOS process. The invention also provides for low peak power consumption, including, but not limited to, about 10.8 mW for the transmitter and about 5.4 mW for the receiver, respectively. Further, depending on the implementation, the measured maximum baseband data rate of the proposed radio of the present invention is about 2.3 Mb/s.

In one embodiment, the above teachings for an uncoded case are extended to coded asynchronous communication using error correction. In this embodiment, a forward error correction scheme for asynchronous sensor communication is disclosed where the dominant errors consist of pulse deletions and insertions, and where encoding is required to take place in an instantaneous fashion. The presented scheme consists of a combination of a systematic convolutional code, an embedded marker code, and power-efficient frequency shift keying (FSK) modulation at the sensor node. Decoding is first obtained via a maximum a-posteriori (MAP) decoder for the marker code which achieves synchronization for the insertion and deletion channel, followed by MAP decoding for the convolutional code. Besides investigating the rate trade-off between marker and convolutional codes, residual redundancy in the asynchronously sampled and quantized source signal are successfully exploited in combination with redundancy only from a marker code. This provides a low complexity alternative for deletion and insertion error correction compared to using explicit redundancy.

Another embodiment a forward error correction scheme for asynchronous sensor communication is accomplished where a continuous-time sparse waveform signal is asynchronously sampled and communicated over a noisy channel via Q-ary frequency-shift keying. The presented concatenated code employs outer systematic convolutional codes and inner embedded marker codes that effectively preserve the timing information along with a protection against symbol insertions and deletions. By iteratively decoding the marker and convolutional codes along with interleaving a short block of parity bits, a significant reduction in terms of the expected end-to-end distortion between original and reconstructed signals can be obtained compared to non-iterative processing.

Any combination and/or permutation of the embodiments and objects described are envisioned and within the scope of the invention. Depending on the embodiment uncoded asynchronous communication, coded asynchronous communication, or both uncoded and coded asynchronous communication may utilize the present invention. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

FIG. 26 is a table illustrating code rates and puncturing schemes for the employed systematic convolutional codes; and FIG. 27 is a graph illustrating MSE distortion for the codes from FIG. 26.

DETAILED DESCRIPTION

Wireless sensor networks are spatially distributed autonomous sensors to monitor, for example, physical or environmental conditions. The wireless sensor networks industry has been predicted to become a multibillion-dollar market in the next decade. Today, wireless sensor networks have been widely used in many mobile and embedded systems. Example applications include, but not limited to, military and security surveillance, industry and machine inspection, construction and building examination, environment and health monitoring, and the like. Wireless sensor networks are built of wireless sensor nodes. Each sensor node continuously senses an analog signal, converts the sensed signal into binary format digital data, and delivers the data wirelessly through radio transceivers to a processing device, such as a micro-controller. A limitation of such a wireless sensor is the high power consumption due to constant-interval sampling. This is because in most of applications, the input signal is sparse or pulse-based.

On the other hand, and depending on the implementation, often only rapid variations of the input signal in the sensor architectures are of interest. Conventional synchronous sensor architectures with a constant sampling rate, however, generate a large amount of null data and waste considerable energy when sensing a sparse signal. Moreover, current prevalent synchronous radio circuits only work with synchronous sensor front-end circuits. Completely asynchronous wireless sensor architecture would generate much less data and be more power efficient.

Ultra-Wideband impulse radio (UWB-IR) has been proposed and demonstrated for asynchronous radio [See W. Tang, S. Chen, and E. Culurciello, "Live Demonstration: A FSK-OOK Ultra-Wideband Impulse Radio System with Spontaneous Clock and Data Recovery," in Proceedings of 2012 IEEE International Symposium on Circuits and Systems (ISCAS), pp. 696-700, 2012]. In this previous system, the radio carrier is generated using analog voltage controlled oscillators, and the asynchronous receiver is based on RF log detectors, which is not well suited for low power integrated sensors. Compared to the previous design, the present disclosure proposes a significant hardware modification to this scheme, which enables a carrier generation using a digitally controlled ring oscillator and which reduces the power consumption for the transmitter by a large amount.

Figure 1:
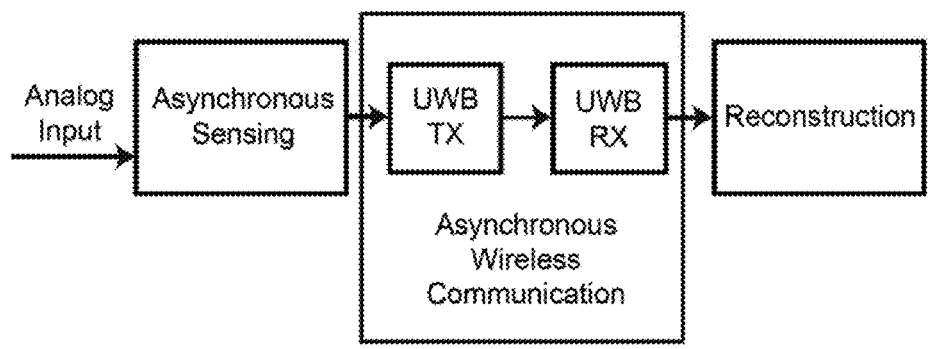
FIG. 1 is a flow diagram illustrating an asynchronous wireless sensing system having an Ultra-Wideband (UWB) impulse radio used for asynchronous communication.

Adverting to the drawings, FIG. 1 illustrates an overview about the proposed asynchronous communication system where the analog input signal is converted to asynchronous pulses and transmitted by asynchronous radio using UWB-IR. A numerical simulation is provided of the whole system for transmission over a noisy communication channel where the obtained performance results assist in providing guidelines for the design of hardware implementation. It was observed that the initial proposed system mainly suffered from errors due to deletion of received pulses at low signal-to-noise ratios. Based on these results it was then proposed that both a low complexity UWB receiver and transmitter hardware implementation be used. An ASIC (application-specific integrated circuit) microchip may be fabricated using the present invention and manufactured using an IBM 0.18 μm CMOS process.

I. Asynchronous Communication System

A. Computer Simulation Setup

Figure 2:
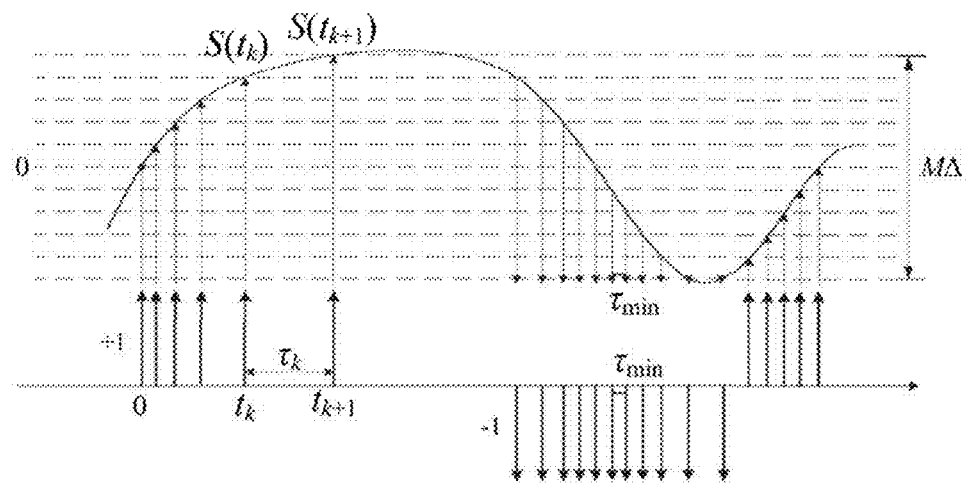
FIG. 2 is a graph illustrating asynchronous sampling operation.

In this section, numerical simulation results are provided for the proposed asynchronous communication system. The asynchronous sampling stage for converting the analog waveform signal into discrete-time samples is shown in FIG. 2. Here, the waveform signal is sampled with equidistantly spaced decision levels, where the number of employed thresholds is given by M. Further, S(t) denotes the amplitude of the signal, tk the timing information of the samples, and τk the interval between $t_k$ and $t_{k+1}$, respectively. The quantization interval Δ is defined as $$\Delta \triangleq \frac{2\max(|S(t)|)}{M}, \quad (1)$$

A "+1" (positive) sample is placed whenever a decision level of an integer multiple of Δ is exceeded by the waveform signal in the direction of increasing amplitude, otherwise a "−1" (negative) sample is placed. After sampling, the samples are modulated by frequency shift keying (FSK) modulation. Carrier pulses are applied and given as $$C_{f_n}(t) = \begin{cases} \sqrt{\dfrac{E}{T}} \left( \dfrac{\sin(\pi t/2T)}{\pi t/2T} \right) \cos\left((n+0.5)\dfrac{nt}{T}\right), & t \in \left[-\dfrac{\tau k}{2}, \dfrac{\tau k}{2}\right], \\ 0 & \text{otherwise,} \end{cases} \quad (2)$$

where $3T/2n+1$ denotes the time interval from zero to the first zero crossing of the pulse for $n \in \{1; 2\}$, E is the pulse energy, and $\tau k$ the time difference between two samples at time k. Every pulse is band limited to the frequency range $[n/2T, (n+1)/2T]$. The positive and negative pulses obtained from the sampling stage are multiplied by $C_{f_1}(t)$ and $C_{f_2}(t)$, respectively. The smallest possible sampling interval is defined, which is a function of the source waveform signal, M, and $\Delta$ as $\tau_{min}$ shown in FIG. 2. In order to avoid carrier interferences due to overlapping FSK pulses, the length of the pulses $\tau_k$ is fixed to $\tau_{min}$.

Figure 3:
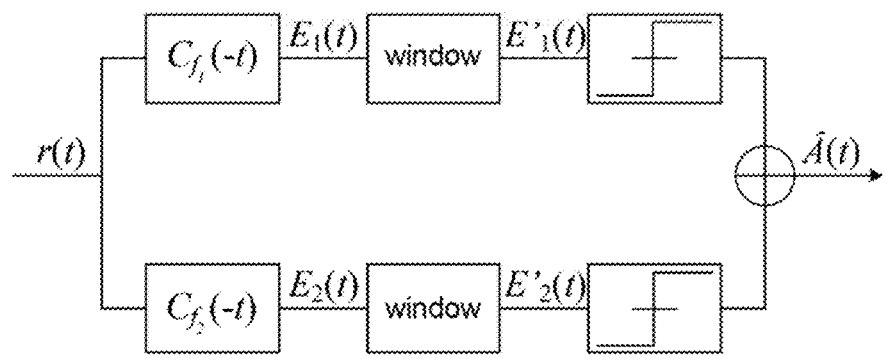
FIG. 3 is a block diagram of a receiver.

The received signal r(t) is composed of pulses of frequencies $f_1$ and $f_2$ plus additive noise n(t), which is given as $$r(t) = \sum_{i=1}^{P} C_{f1}(t - t_i^{f_1}) + \sum_{j=1}^{q} C_{f2}(t - t_j^{f_2}) + n(t), \quad (3)$$

where p and q represent the number of pulses with frequency $f_1$ and $f_2$, respectively. A block diagram of the corresponding receiver is shown in FIG. 3, where two matched filters are used $C_{f_1}(-t)$ and $C_{f_2}(-t)$ to recover the samples. After smoothing the matched filter output energies $E_{1/2}(t)$ with a suitable time window, a threshold decision is performed on the filtered energies $E'_{1/2}(t)$ with a suitably selected threshold.

B. Results

The employed waveform source signal consists of a heart beat signal from a mouse, recorded via an electrocardiogram with a sampling frequency of 20 kHz. In order to simulate a quasi-continuous-time signal and to mimic a proper sampling operation 10,000 points were interpolated between all the adjacent samples of this signal. The bandwidth of the baseband FSK pulses is chosen as 1/2T=10 MHz, thus the carrier frequencies are given as $f_1$=15 MHz and $f_2$=25 MHz. Further, E=1 in the previously shown formula (2), and it was considered an additive white Gaussian noise (AWGN) channel.

Figures 4A, 4B:
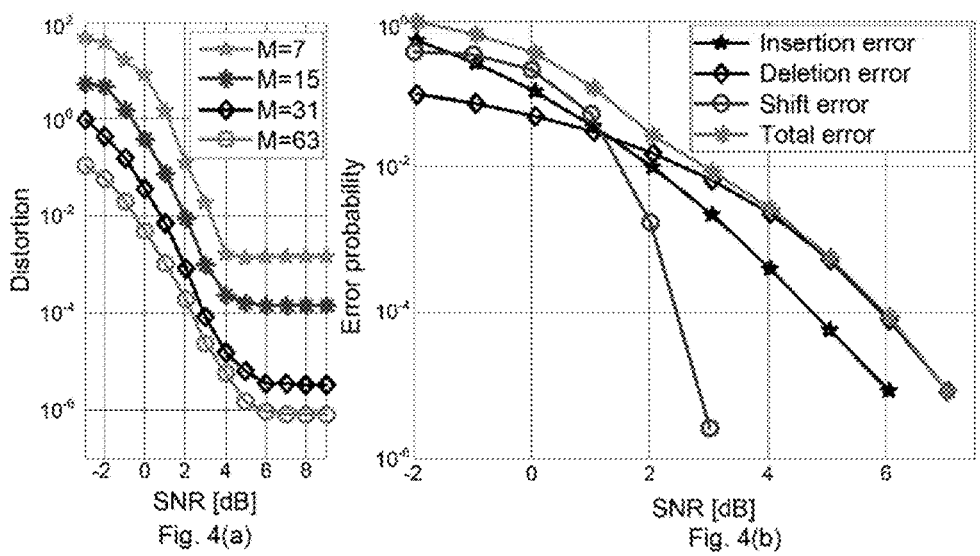
FIG. 4A is a graph illustrating distortion for different numbers of quantization thresholds.
FIG. 4B is a graph illustrating error probability.

FIG. 4(b) illustrates error probabilities for the different error types occurring in the system, namely insertion, deletion, and shift errors, and the total error probability over the bandlimited signal-to-noise ratio (SNR) on the AWGN channel. The results have been obtained by averaging 400 simulated transmissions over the AWGN channel for 10 ms of the source waveform signal.

The shift errors shown in FIG. 4(b) are generated by time position shifts of the reconstructed pulses due to small changes of the shape of the energy waveforms $E'_{1/2}(t)$ under channel noise. The shift error probability is defined as $$P_e \triangleq Pr(\{|(t_i - d_1) - \hat{t}_i| > \tau_{tol}\}). \quad (4)$$

For formula (4) shown above, $t_i$ and $\hat{t}_i$ are the time positions of the i-th original and reconstructed sample, respectively, and $d_i$ is a small offset to align both the original and recovered signal at time zero. If the time difference exceeds the value of $\tau_{tol}$, which is a prescribed tolerance parameter, a shift error is declared. In FIG. 4(b), $\tau_{tol}$ is chosen as $\tau_{tol}$=0.3 ms without loss of generality. Insertion errors are obtained in the low SNR regime due to the noise-induced signal fluctuations at the output of the windowed matched filter as for a fixed decision threshold in this case a new pulse may be detected which is not present in the original signal. Similarly, if an original pulse is not detected due to channel noise, a deletion error is obtained and declared. As shown in FIG. 4(b), the deletion errors are small when the SNR is low, since in this regime more insertions occur than deletions.

Adverting to FIG. 4(a), shown is the distortion D for different numbers of quantization thresholds M versus the SNR on the AWGN channel, where D is defined as in formula (5):

$$D \triangleq \frac{1}{T_d} \int_0^{T_d} |S(t - d_1) - \bar{S}(t)|^2 dt. \quad (5)$$

The above Formula (5) illustrates with $T_d$ denoting the overall duration of the waveform signal. The distortion decreased with increasing SNR and eventually reached a constant level. This constant level is only determined by M and corresponds to the noiseless reconstruction distortion. Note that for M=7 the average sampling rate amounts to 4.3 kHz, which is a reduction by 78.5% compared to the original synchronous sampling rate of 20 kHz.

II. Asynchronous Radio Circuit Design

The asynchronous radio transmitter and receiver are designed based on the specifications of an implantable biomedical application that may require a data rate as high as 50 Mb/s, for example. Since in asynchronous sensing each sample can be represented by using only 2 bits (positive or negative), savings of roughly 80% of the data rate can be obtained compared to a traditional system that requires 10 bits to represent one sample.

By applying the results from the above Result Section I-B of a 78.5% sampling rate reduction, the minimal target data rate of the asynchronous radio is given as 50(1−0.785)(1−0.8)=2.15 Mb/s, which is a significant reduction compared to the synchronous case. The sub-GHz UWB frequency band was chosen for the radio because of the high tissue absorption of high frequency signals (>1 GHz) in implantable applications based on previous scientific experiments. The proposed asynchronous radio applies frequency-shift-keying on-off-keying (FSK-OOK) modulation.

A. Transmitter Design

Figure 5:
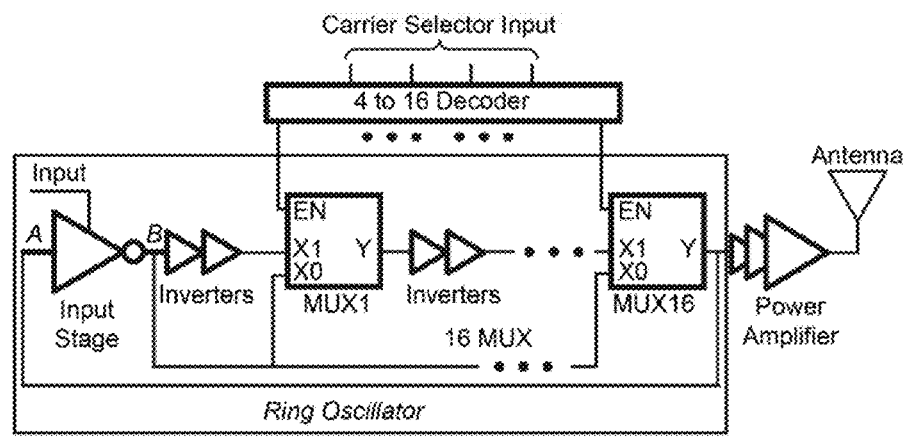
FIG. 5 is a diagram for FSK (frequency shift keying)-OOK (on-off-keying) transmitter structure.

The proposed asynchronous radio uses two separate transmitters with FSK-OOK modulation for positive and negative pulses. Each transmitter consists of a ring oscillator with an input stage, a multiplexer chain, and a power amplifier. The baseband data is sent to the input stage, which performs OOK. The ring oscillator generates the RF carriers for the impulse modulation. The frequency of the RF carrier is controlled by a multiplexer chain, which performs FSK. The RF impulse is delivered to a power amplifier which drives the transmitter antenna. The simplified schematic of the transmitter is shown in FIG. 5.

OOK is realized at the input stage, which is implemented as a special inverter in the inverter-based ring oscillator with an enable signal as the data input. As shown in FIG. 5, when the input is logic low, the input stage is disabled. This cuts off the oscillation in the whole ring oscillator. On the other hand, when the input is logic high, the input stage is enabled, and the ring oscillator starts oscillating. Thus, the input data is modulated through the ring oscillator via OOK.

FSK is implemented by controlling the multiplexers in the ring oscillator. As shown in FIG. 5, each multiplexer has an enable signal EN. When the EN signal is logic high, the multiplexer passes the input X1 to the output Y, otherwise it passes the input X0 to the output Y. The difference between X1 and X0 is that the path of X1 contains more inverters than the path of X0. Thus, selecting X1 introduces more delay to the ring oscillator and lowers the oscillation frequency. In this example and design there are 16 multiplexers in the ring oscillator. Depending on the implementation, the number of multiplexers may vary for a specific application. By controlling the EN signals of the multiplexers, the frequency of the oscillator is adjusted. The total of 16 frequencies is selected by using a 4-to-16 decoder that translates a 4 bit binary code to a 16 bit thermometer code for the multiplexers. The power amplifier is made up of an inverter chain where the size of the inverter is increased at each stage. Further, it is able to drive the antenna up to the maximum carrier frequency.

B. Receiver Design

Figure 6:
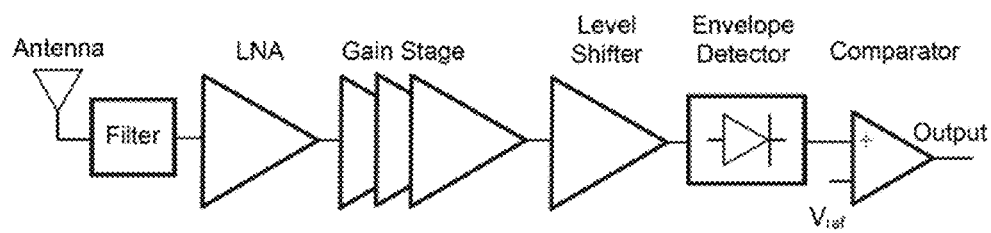
FIG. 6 is a block diagram illustrating non-coherent receiver structure.

A non-coherent detection is utilized by the two receivers to detect positive and negative received pulses separately as shown in FIG. 3. Each receiver consists of a front-end filter, a low noise amplifier, a gain stage, a level shifter, an envelope detector, and a comparator. The receiver block diagram is shown in FIG. 6.

The first stage of the receiver is an off-chip bandpass filter to separate the positive and negative carriers. Then on the chip, a sub-mW UWB CMOS LNA is implemented followed by the RF gain stages. Next, a level shifter shifts the DC value of the amplified RF signal from VDD/2 to GND. After that, an envelope detector is used to recover the baseband signal. The envelope detector is designed using a diode connected MOSFET followed by a capacitor in parallel with a discharging resistor. Both capacitor and resistor determine the time-constant for the charging and discharging paths, which is designed based on the carrier frequency and the baseband data rate. The detected envelope of the RF signal is digitized by using a level-crossing comparator. The comparator is designed with hysteresis to avoid noise at the level crossing boundary. An external DC signal serves as the reference voltage for the comparator. A multi-stage digital buffer follows the comparator to further enhance the output fan-out of the receiver. Simulated waveforms at different positions in the receiver are displayed in FIG. 7.

The transmitter and receiver circuits were designed and fabricated using an IBM 7RF 0.18_m CMOS technology. The power supply for both microchips is 1.8V, however voltage may vary depending on implementation and application. The core sizes of the transmitter and receiver are 276 μm×114 μm and 200 μm×86 μm, respectively.

The transmitter is designed to transmit pulses with a frequency range from 240 to 960 MHz. The frequency range of the receiver is between 200 MHz and 1 GHz. In a simple test setup monopole antennas are used for both transmitter and receiver. The maximum measured baseband data rate between the transmitter and receiver is 2.3 Mb/s, which is higher than the design specification target of 2.15 Mb/s. At this rate, the peak power consumption of the transmitter is 10.8 mW, whereas the receiver's power consumption is 5.4 mW. In the setup used in the above experiments for the present invention, the transmission distance between the transmitter antenna and receiver antenna is 15 cm.

Figures 7, 8:
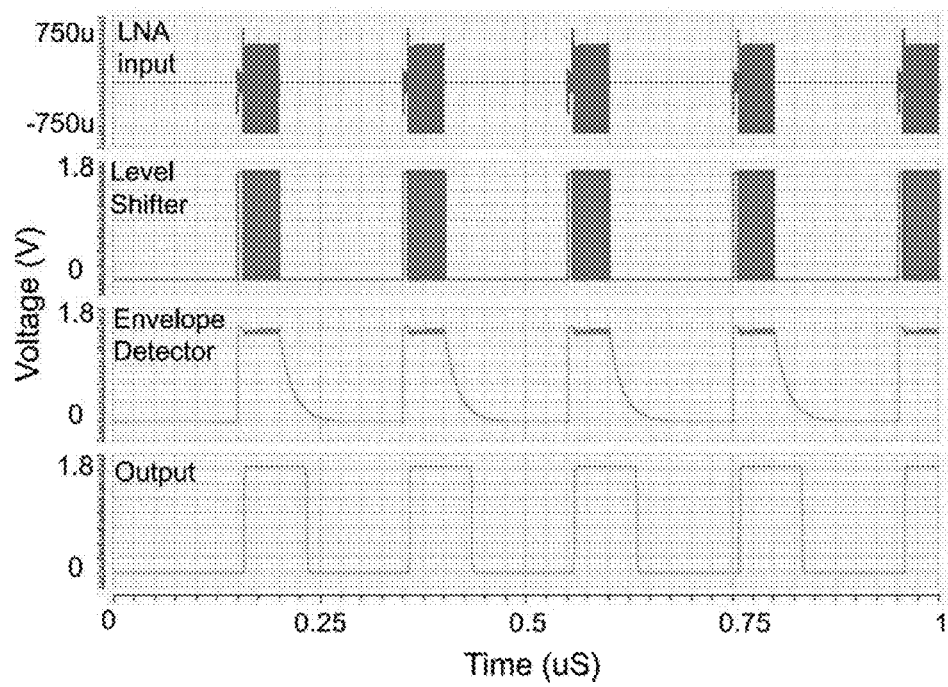
FIG. 7 is a graph illustrating simulation result of the receiver at different nodes.
FIG. 8 is a table illustrating comparison of a proposed transmitter/receiver ASIC (application-specific integrated circuit) microchip compared with prior art ASIC microchips.

FIG. 8 illustrates a Table that compares important design parameters between application of the present invention and prior published results. The Table in FIG. 8 shows that the proposed and present invention of the asynchronous wireless sensing architecture that is applied as compared with the prior approaches allows more data rate for the Receivers of 2.3 Mbit/sec compared to 100 kbit/sec and 1 Mbit/sec for prior approaches. Also seen in FIG. 8 for application using the present invention, both the transmitters and receivers permit a narrower bandwidth for applications than compared to the prior approaches. Power consumption measured in mW in FIG. 8 for application of the present invention is less than conventional techniques and less for the present invention for given Data Rate per Power utilized in FIG. 8.

Shown and described herein is improved asynchronous wireless sensor architecture. Software simulations show that the system of the present invention can communicate reliably at moderate SNR values, and in low SNR the predominant type of errors are pulse deletions at the receiver.

Compared to the above methods the presently disclosed asynchronous technique completely removes the clock circuitry, which improves energy efficiency and effective data rate, and ultimately solves clock synchronization problems, while reducing bit-error-rate (BER) by eliminating effects from clock jitters.

Moreover, compared to previous attempts, the invention offers high-speed data communication since there is no global worst-case latency. Furthermore, the present invention reduces electromagnetic noise emissions from the clock, which is particularly helpful in medical applications.

III. Error Correction for Asynchronous Communication

In this embodiment, the previous results for the uncoded case are extended to coded asynchronous communication. This is the first time that error correction has been addressed in the context of a communication system based on asynchronous sampling. Note that synchronous insertion/deletion error correcting schemes currently in the art cannot directly be applied to the asynchronous setting. For example, the fact that in asynchronous communication the information about the underlying waveform signal is mostly contained in the timing information of the transmitted signal pulses only allows to embed code redundancy via extending the modulation alphabet and not by adding extra pulses. For the same reason, the code must be necessarily systematic.

These constraints are addressed in the following example by a deletion/insertion correction scheme based on a combination of a systematic convolutional code, an embedded marker code, and power-efficient frequency-shift keying (FSK) modulation at the sensor node tailored to the asynchronous setting. Note that employing a convolutional code allows for encoding in a streaming fashion with low latency and only requires a buffer length of a few bits at the complexity constrained sensor node. Also shown is that residual redundancy in the asynchronously sampled and quantized source signal can be successfully exploited for synchronization in combination with a marker code, thus providing an extremely low complexity alternative to using explicit redundancy from a channel code.

A. Asynchronous Sampling

Figure 9:
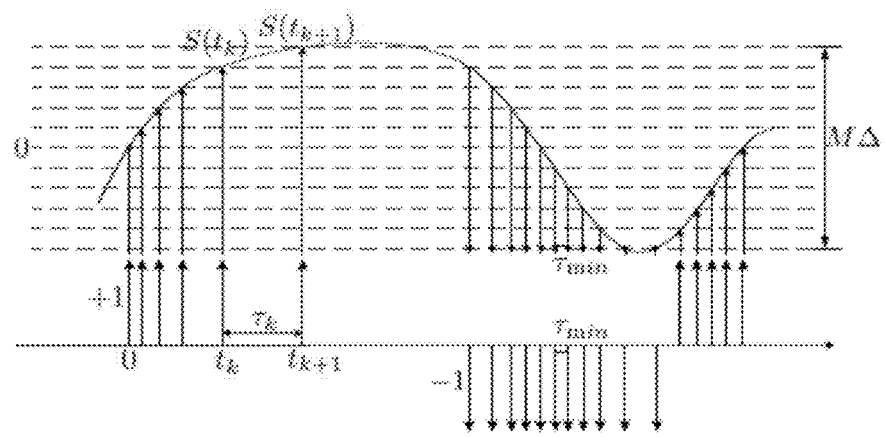
FIG. 9 is a graph illustrating asynchronous sampling via asynchronous delta modulation.

It was previously shown having an asynchronous sample acquisition process carried out at the sensor node [6]. FIG. 9 shows a waveform quantized by using asynchronous delta modulation, where $S_{(t_k)}$ denotes the amplitude of the waveform signal at time $t_k$. Depending on the embodiment, at each time the waveform is compared with M thresholds, with the quantization decision interval defined as $\Delta \stackrel{\Delta}{=} 2 \max_t (|S(t)|)/M$. Whenever the waveform exceeds a decision threshold in the direction of increasing amplitude a "+1" sample is recorded at that specific time, otherwise a "−1" sample is placed; "+1" and "−1" are mapped to bits 1 and 0, respectively. In order to implement this scheme, no clock circuit is required at the sensor node as compared to a traditional Nyquist based "sample and quantize" operation, which significantly reduces the power consumption of the sensor node.

B. System Model

Figure 10:
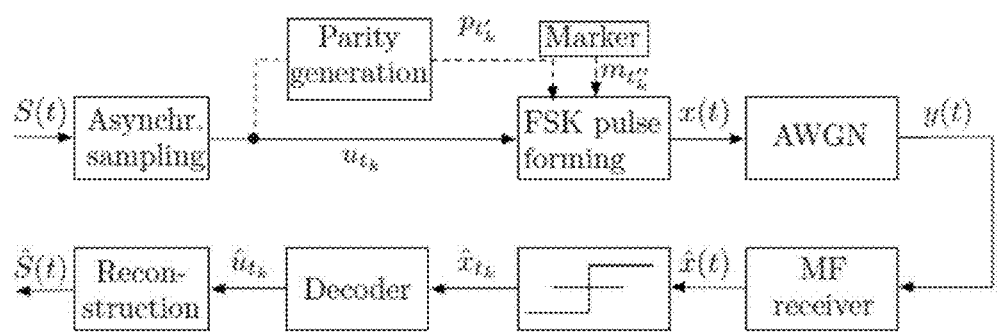
FIG. 10 is a block diagram illustrating a system model of one embodiment of the present invention.

In one implementation, the system model is shown in exemplarily FIG. 10. First, the analog waveform signal S(t) is asynchronously sampled into the sample bits $u_{t_k}$ at time $t_k$, k=1, . . . , T, as described herein, where T denotes a prescribed number of transmitted bits. Then, along with generated parity bits $p_{t'_k}$ and marker bits $m_{t''_k}$ to ensure synchronization, Q-FSK pulses comprising orthogonal sinc waveforms are generated. FSK modulation is employed due to its power efficiency and its suitability for ultra-wideband radio operation (see [6]). For this example, Q is restricted to Q=2 for the uncoded and to Q=4 for the coded case, respectively. Note that in order to preserve the timing information generated in the sampling process, redundancy can only be added by extending the symbol alphabet, which also extends the bandwidth of the transmission.

Figure 11:
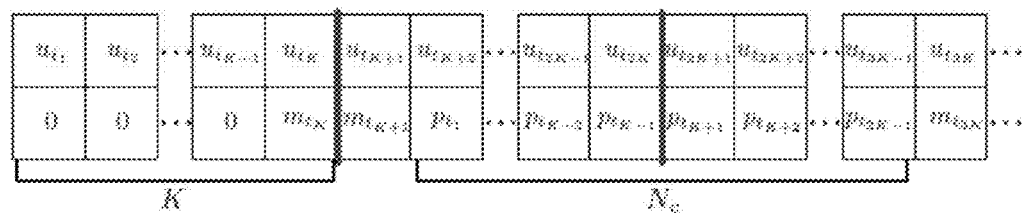
FIG. 11 is a diagram illustrating combination of information and redundant bits for FSK pulse forming where a 4-FSK symbol is obtained by combining the bits stacked on top of each other.

FIG. 11 addresses the coded case for Q=4 and shows how asynchronously sampled information bits $u_{t_k}$, parity bits $p_{t'_k}$, and marker bits $m_{t''_k}$ are arranged to form Q-ary modulation symbols. Each of these symbols is transmitted at a specific time $t_k$ determined by the timing information generated in the asynchronous sampling stage. During the first block of K symbols, only information bits are communicated, with the parity bits set to zero. At time $t_K$, a marker bit $m_{t_K}$ is added, whose value is fixed and assumed to be known at the receiver.

The receiver uses this marker information to resynchronize the received bit sequence from deletion and insertion errors. The next block in FIG. 11 contains information bits from time $t_{K+1}$ to $t_{2K}$ and another marker bit at time $t_{K+1}$. The redundancy in the rest of the block is constituted by parity bits generated from the information bits in the previous length-K block.

This "chaining" approach for the parity bits is required due to the causality of the encoding process and the fact that the timing information $t_k$ for each waveform sample must be preserved. The number of samples (or FSK pulses) between two blocks of marker bits is defined as $N_c$. As one important practical constraint, typically K is required to be quite small, since it is directly related to chip area and energy consumption of the sensor. For that reason we will employ parity bits $p_{t'_k}$ obtained from a systematic convolutional code with rate $R_c$=K/N. Also, let $R_m$ denote the code rate for the marker code. Then, for Q=4 the constraint obtained for $R_c R_m$=½ for the tradeoff between the two code rates.

After encoding, the modulated signal x(t) is transmitted over an AWGN channel. The observation at the channel output y(t) is applied to a matched filter (MF) receiver and the channel decoder which ensures resynchronization, for example, insertion and deletion error correction, and the correction of substitution errors on the channel, followed by the waveform reconstruction stage. In the MF receiver, the output of the Q matched filters is compared with a threshold on a very fine grid (by running a high frequency local clock at the base station), and whenever the threshold is exceeded, the corresponding Q-ary symbol is reconstructed. A deletion error occurs when the energy waveform after the MF lies below a certain threshold γ. In contrast, an insertion takes place when channel noise during a silent phase triggers the threshold.

C. Error Correction

In the past, as seen in reference footnote [10], a forward backward algorithm (FBA) for correcting insertion, deletion, and substitution errors for synchronous transmission was introduced based on ideas from reference footnote [8].

In contrast, the present invention in this embodiment defines $x^T_1=(x_1; x_2; \ldots, x_T)$ as the transmitted bit sequence of length T when conveyed through the deletion/insertion channel. Likewise, $y^R_1=(y_1, y_2, \ldots, y_R)$ is the received sequence of length R, where both R and T are assumed to be known at the receiver. The sequence $x^T_1$ is composed of equal length information segments interrupted by periodic marker bits. $D_{k,n}$ is defined as the event that when the transmitted bit length is k, the received bits length is exactly n, where k∈{1, 2, 3 . . . , T}, n∈{1, 2, 3, . . . , R}. $D_{k-1,n-1} \rightarrow D_{k,n}$ represents a transmitted bit potentially suffering a substitution error, while $D_{k-1,n} \rightarrow D_{k,n}$ and $D_{k-1,n-2} \rightarrow D_{k,n}$ denote a bit being deleted and inserted during transmission, respectively.

It is known in the classical BCJR algorithm [16] defined is $$\alpha_{k,n} \triangleq P(D_{k,n}, y_1^n)$$

and $$\beta_{k,n} \triangleq P(y_{n+1}^R | D_{k,n}).$$

Then, forward and backward recursion are defined as [8] seen in below formula (1):

$$\alpha_{k,n} = \frac{P_i}{4}\alpha_{k-1,n-2} + P_d\alpha_{k-1,n} + P_t\alpha_{k-1,n-1}\sum_{x_k} P(x_k)(1-P_s)^{\delta_{x_k,y_n}} P_s^{1-\delta_{x_k,y_n}}, \quad (1)$$

with $\delta_{x,u}$ denoting the Kronecker delta. Further, $P_i$ and $P_d$ denote insertion and deletion probabilities, respectively, $P_s$ is defined as the substitution (symbol) error probability, and $$P_t \triangleq 1 - P_i - P_d.$$

The recursion for $\beta_{k,n}$ is defined similarly. Finally, we obtain the below formula (2):

$$P(y_1^R | x_k) = \sum_{n=2}^{min(2k,R)} \frac{P_i}{4}\alpha_{k-1,n-2}\beta_{k,n} + \sum_{n=0}^{min(2k,R)} P_d\alpha_{k-1,n}\beta_{k,n} + \sum_{n=0}^{min(2k,R)} P_t\alpha_{k-1,n-1}\beta_{k,n}(1-P_s)^{\delta_{x_k,y_n}} P_s^{1-\delta_{x_k,y_n}}. \quad (2)$$

D. Inner Decoding of Synchronization Errors

The above algorithm of formula (2) in the last section C is employed with some modifications as an inner decoder for synchronization errors in the asynchronous communication setup. Timing information $t_k$ is also denoted and used interchangeably as just k in this section. FIG. 11 indicates that the symbol alphabet is now defined over $\mathbb{F}_4$, which means that (1), the corresponding equation for $\beta_{k,n}$, and (2) must be modified for the resulting symbol based FBA. Specifically, the a priori probability $P_t/4$ must be replaced with $P_t/16$. Further, for $x_k$, $y_n \in \mathbb{F}_4$ if $x_k$ contains a marker bit 0, i.e., $x_k \in \{|00|,|10|\}$, then $P(x_k=|00|)=P(x_k=|10|)=0.5$. Likewise, if $x_k$ contains a marker bit 1, i.e., $x_k \in \{|01|,|11|\}$ then $P(x_k=|01|)=P(x_k=|11|)=0.5$, otherwise $P(x_k)=0.25$. Calculated is the conditional marginal log-likelihood ratio (LLR) for the information bit $u_k$ at time $t_k$ from the output of the symbol-based FBA as shown in the below formula (3):

$$L(u_k | y_1^R) = \log\left(\frac{P(x_k = [00] | y_1^R) + P(x_k = [01] | y_1^R)}{P(x_k = [10] | y_1^R) + P(x_k = [11] | y_1^R)}\right) \quad (3)$$

These LLRs, depending on the embodiment, can be used to directly determine the transmitted data via hard decision decoding or can be further utilized in the outer decoder for the convolutional code. For this applied was the standard BCLR algorithm [16], which is employed to recover the substitution errors remaining at the output of the inner decoder. Here, the information block length K in FIG. 11 is the number of information bits associated with a single state transition for the convolutional code. Even if recovery of the position of a deleted pulse as outlined below is able, its value is still unknown and thus can be seen as an erased symbol with respect to the outer convolutional code.

E. Location of Deleted and Inserted Symbols

Figures 12A, 12B:
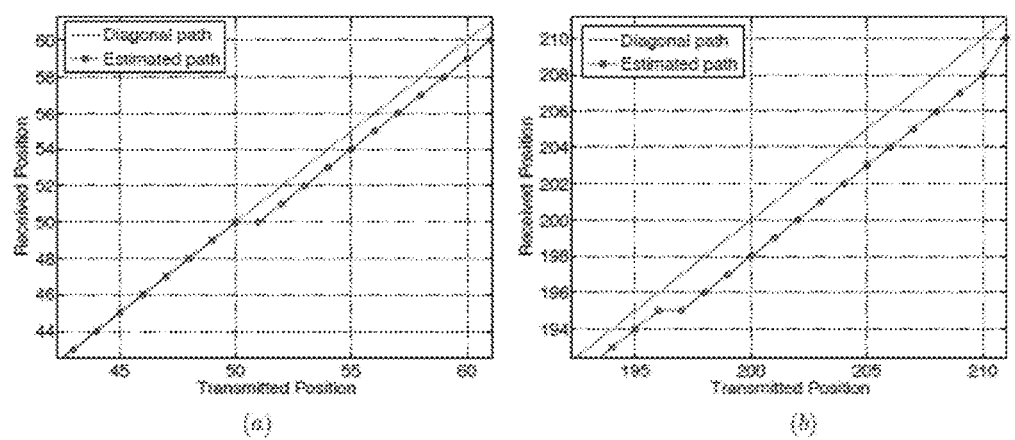
FIGS. 12A and 12B are graphs showing optimum path to locate deletions and insertions regarding received positions and transmitted positions.

The obtained results from inner synchronization decoding are now employed to localize the position of deleted and inserted FSK pulses by visualizing the evolution of transmitted and received symbols on a two dimensional grid of dimension T×R. Examples are shown in FIG. 12A-12B. A diagonal path with $n(k)=k$ means that no insertions or deletions have occurred during transmission. In contrast, for synchronization errors the path deviates from the diagonal line, where deletion errors cause the path to move upwards, and insertion errors downwards, respectively. For example, in FIG. 12A, there is a deletion at transmitted position 50, and FIG. 12B shows both a deletion and an insertion at transmitted positions 197 and 212, respectively.

By leveraging the results from the symbol-based FBA, this path can be estimated by obtaining the most likely grid point $\hat{n}(k)$ at position k belonging to this path as shown in below formula (4):

$$\hat{n}(k) = \underset{n}{\mathrm{argmax}} \left\{ \frac{P_i}{16} \alpha_{k-1,n-2} \beta_{k,n}, \right. \quad (4)$$

$$\left. P_d \alpha_{k-1,n} \beta_{k,n}, P_t \alpha_{k-1,n-1} \beta_{k,n} (1 - P_s)^{\delta_{x_k,y_n}} P_s^{1-\delta_{x_k,y_n}} \right\}.$$

Figure 13:
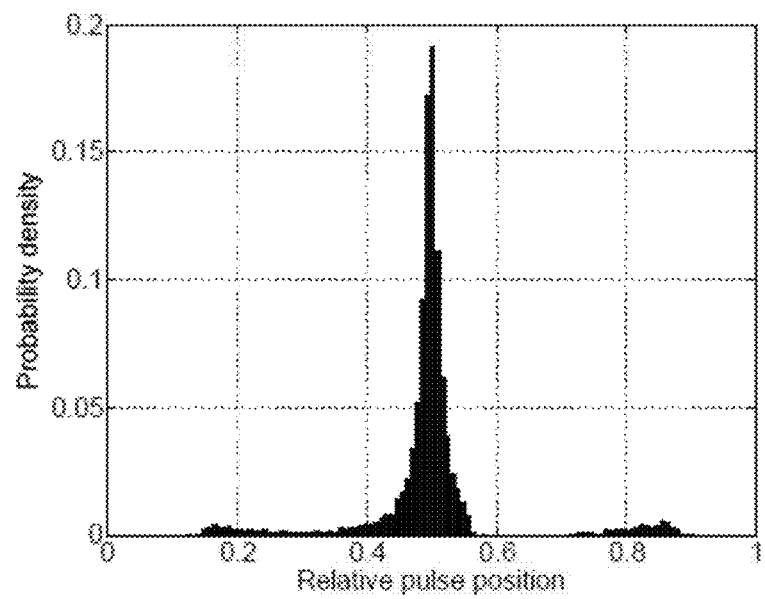
FIG. 13 is a graph illustrating distribution of the relative position of deleted pulses between its neighbors for a typical waveform signal in medical applications with an example of the heart beat signal of a mouse.

For insertions errors, removed are the extra pulses directly where they are located. However, the exact position of a deleted pulse after MF filtering between adjacent pulses at times $t_k$ and $t_{k+1}$ is still unknown and cannot be recovered at the receiver. As a workaround empirically obtained was the distribution of the relative position of deleted pulses between its neighbors for, as an example but not limited to, a typical waveform signal in medical applications, a mouse heart beat signal of 10 ms duration, asynchronously quantized with M=63 threshold levels. The resulting distribution for the normalized sample position is shown in FIG. 13. As seen in FIG. 13, the distribution is highly concentrated around the midpoint of the interval, such that placing a deleted pulse at this midpoint will only incur a small additional end-to-end distortion in the average.

F. Exploiting Residual Source Redundancy

In the following section, introduced is a simple model for data bits obtained by asynchronously quantizing the waveform source signal. This allows exploitation of residual source redundancy in the outer decoder instead of explicit redundancy from a convolutional code. The proposed model makes use of the simple observation that for an asynchronously sampled waveform signal with moderate M obtained data sequence contains alternating contiguous runs of the form "00 . . . " and "11 . . . ". The most conservative case was considered by addressing only the two-bit "runs" "00" and "11", which leads to the four-state Markov chain depicted in FIG. 14. Based on the transition probabilities α and β computed was the steady state probabilities $\mu_i$ for state $S_i$, $i \in \mathcal{I}$, $\mathcal{I} = \{0,1,2,3\}$, as:

$$\mu_0 = \frac{\bar{\alpha}\beta}{2\bar{\alpha}\beta + \bar{\alpha} + \beta} = \mu_2, \mu_1 = \frac{\beta}{2\bar{\alpha}\beta + \bar{\alpha} + \beta}, \text{ and } \mu_3 = \frac{\bar{\alpha}}{2\bar{\alpha}\beta + \bar{\alpha} + \beta}$$

with $\bar{\alpha} \triangleq 1 - \alpha$ and $\bar{\beta} \triangleq 1 - \beta$, respectively. For the above mentioned mouse heartbeat signal and M=63 obtained was α=0.9533 and β=0.9537. The entropy rate of this source can be computed as:

$H(\chi) = -\Sigma_{x \in \chi} \mu_i \Sigma_{j \in \chi} p_{ij} \log_2 p_{ij} = 0.1798$ bits with $p_{01} = p_{23} = 1$, $p_{11} = \alpha$, $p_{12} = \bar{\alpha}$, $p_{33} = \beta$, $p_{34} = \bar{\beta}$, and all other $p_{ij}$ are zero.

Figure 14:
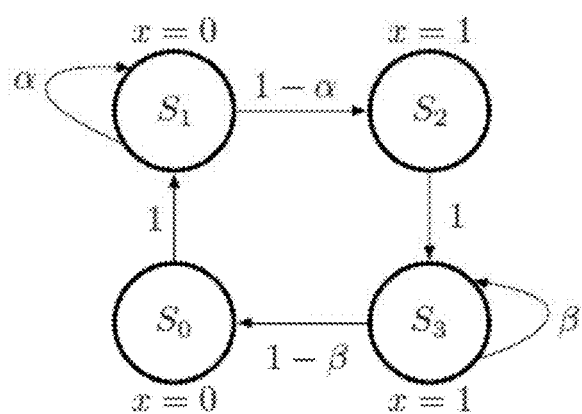
FIG. 14 is a diagram illustrating a four-state Markov chain with states $S_0; \ldots, S_3$ for the data bits obtained by asynchronously quantizing the source signal where x indicates the output for each state.

Now a variant of the BCJR algorithm can be used to compute the a posteriori probabilities $P(\Psi_k = p | y_1^R)$ for the state $\Psi_k$ at time $t_k$ where p, $q \in \mathcal{I}$ as illustrated in below formula (5):

$$P(\Psi_k = p | y_1^R) = \sum_{q \in \mathcal{I}_p} P(\Psi_k = p, \Psi_{k+1} = q | y_1^R) \quad (5)$$

$$= \sum_{q \in \mathcal{I}_p} \alpha_k(p) \gamma_k(p,q) \beta_{k+1}(q),$$

where $\mathcal{I}_p$ represents the set of all states at time $t_{k+1}$ that are connected to state $\Psi_k = p$ to further have the below formula (6):

$$\alpha_{k+1}(q) = \sum_{q \in I} \alpha_k(p) \gamma_k(p,q), \quad (6)$$

with a similar definition for the $\beta_k(p)$ term used in formula (5) in this section. Finally the terms is given as $\gamma_k (p,q)$ as shown in the below formula (7):

$$\gamma_k(p,q) = P(\Psi_{k+1} = q | \Psi_k = p) \cdot \frac{P(y_1^R | \Psi_k = p)}{P(y_1^R | x_k)} \cdot \frac{P(y_1^R | \Psi_{k+1} = q)}{P(y_1^R | x_{k+1})} \quad (7)$$

where P ($\Psi_{k+1}=q|\Psi_k=p$) is the state transition probability of the Markov chain shown in FIG. 14 for p,q$\in \mathcal{I}$. Further the probabilities shown as: $P(y_1^R|\Psi_k=\bar{p})$ and $\overline{P}(y_1^R|\Psi_{k+1}=q)$ are determined by the output of the inner symbol-based FBA and constitute the a priori input for the source BCJR algorithm.

Simulation Results

In order to evaluate the proposed error correction strategy, employed was an 10 ms excerpt of the above mentioned recorded mouse heart beat signal, asynchronously quantized with M=63 threshold levels. The marker bits are fixed as $(m_{izk}, m_{izk})=(0; 1)$ with 1 being an odd integer. The table below shows the employed feedforward convolutional codes for different values of $N_c$, along with the corresponding mother code rates R, punctured rates $R_c$, and marker rates $R_m$. In order to preserve the timing information of the pulses only parity bits are punctured. Also, the puncturing patterns are selected such that the combined deletion, insertion, and substitution error probabilities are minimized CODE RATES AND PUNCTURING SCHEMES FOR THE EMPLOYED SYSTEMATIC CONVOLUTIONAL CODES

| R | Generators (octal) | Puncturing matrix | $R_c$ | $N_c$ | $R_m$ |
|---|---|---|---|---|---|
| $\frac{2}{3}$ | $g^{(1)}=3, g^{(2)}=7$ | — | $\frac{2}{3}$ | 2 | $\frac{3}{4}$ |
| $\frac{1}{2}$ | $g^{(1)}=15$ | $\begin{bmatrix} 1 & 1 & 1 \\ 1 & 1 & 0 \end{bmatrix}$ | $\frac{3}{5}$ | 4 | $\frac{5}{6}$ |
| $\frac{1}{2}$ | $g^{(1)}=15$ | $\begin{bmatrix} 1 & 1 & 1 & 1 & 1 \\ 1 & 1 & 0 & 1 & 1 \end{bmatrix}$ | $\frac{8}{9}$ | 8 | $\frac{9}{10}$ |

Figure 15:
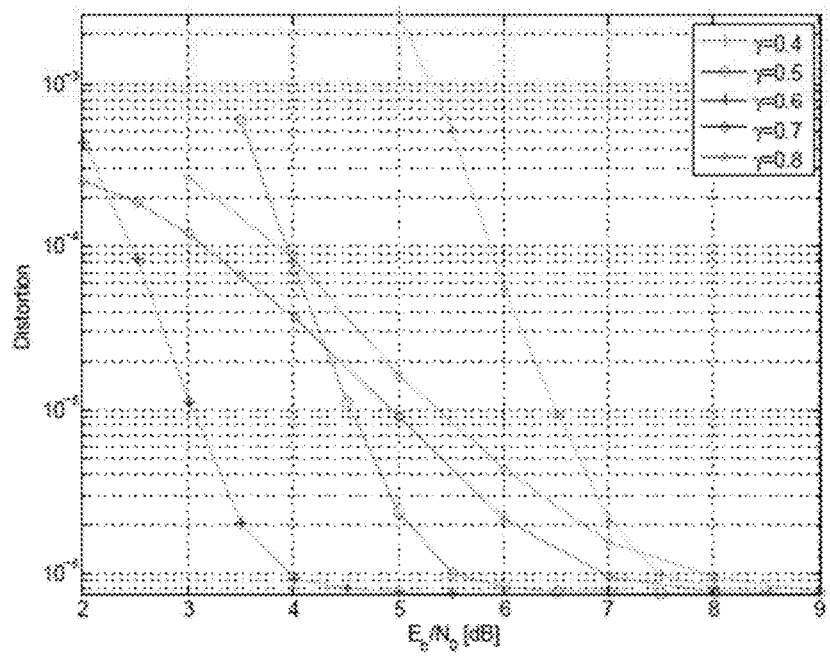
FIG. 15 is a graph illustrating MSE distortion for the code from the first row of a Code Rates and Puncturing Scheme Table I (with $R_c=\frac{2}{3}$) under different MF threshold values $\gamma$.

FIG. 15 displays the achieved end-to-end mean-squared-error (MSE) distortion for the code from the first row of the above Table (Rc=2=3) under different MF thresholds. For high values of deletion errors dominate, whereas for low values of insertion errors are the dominant ones. Note introduced was additional distortion by the potentially erroneous location of inserted and deleted pulses and by approximating the timing information of a deleted pulse by its expected value.

Figure 16:
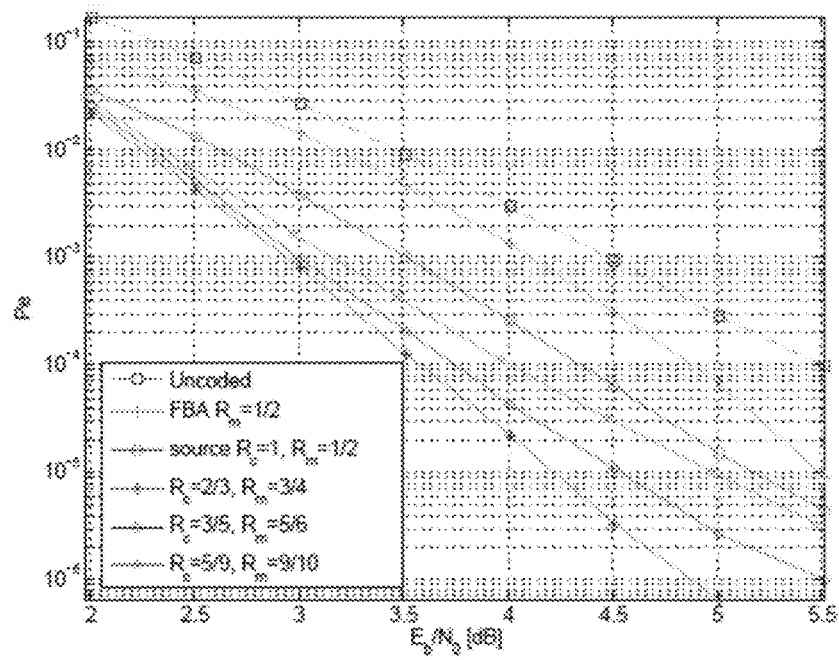
FIG. 16 is a graph illustrating Total error probability for the codes displayed in above Table I and a MF threshold of $\gamma=0:6$ where the scheme with $R_c=1$ uses residual source redundancy and explicit redundancy solely from a marker code.

In FIG. 16 compared was the total symbol error probability, i.e., insertion, deletion, and substitution errors for different amounts of marker redundancy $N_c$ and the codes displayed in the above table for a threshold of γ=0:6. Despite this figure ignores errors due to incorrect localization of the position of deleted and inserted pulses, it still provides a reasonable assessment for the performance of these schemes. FIG. 16 also shows the performance for a scheme in which all explicit redundancy is constituted by a marker code (i.e., $R_m=1=2$, $R_c=1$) and where source redundancy instead of explicit redundancy is used to fix the value of the information bits after deletion/insertion inner decoding. It can be observed from FIG. 16 that increasing marker redundancy, i.e., smaller values of $N_c$, also leads to a smaller total error probability if a convolutional code is used to clean up the residual errors after insertion/deletion decoding. However, the scheme based on source redundancy suffers from a higher error probability even it uses $N_c=0$.

This is due to the fact that despite the entropy rate induced by the source redundancy is low, this does not provide any advantage in minimum distance compared to the uncoded case (i.e., $d_{min}=1$). This is also supported by the observation that for $R_c<1$ additionally exploiting source redundancy after channel decoding does not provide a significant further gain in performance.

Figure 17:
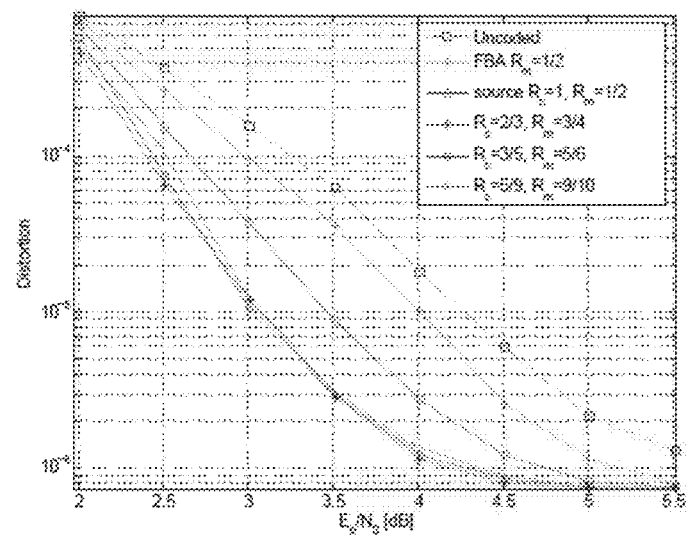
FIG. 17 is a graph illustrating MSE distortion for $\gamma=0:6$ and the codes from FIG. 16.

From FIG. 16 seen was that solely employing source redundancy provides a significant gain compared to just using the inner marker code and a hard decision after the output of the inner FBA decoder. The resulting end-to-end MSE distortion is shown in FIG. 17 which also includes errors due to inaccurate localization of deleted and inserted transmit pulses. Observed was that all three schemes using explicit redundancy have similar performance, whereas the scheme using implicit source redundancy suffers from a performance penalty of around 0.5 dB in SNR for small to moderate channel SNRs. Also, solely employing a marker code without any additional explicit or implicit redundancy incurs an additional penalty of 0.5 dB for moderate SNRs.

Presented in this example was a concatenated error correction scheme for asynchronous communication comprising a combination of a systematic convolutional code, an embedded marker code, and efficient FSK modulation at the sensor node. Simulation results have shown that if explicit redundancy from a convolutional code is employed, a higher ratio of marker bits provides a lower end-to-end distortion. This observation makes residual source redundancy schemes an attractive low complexity alternative with only a small loss in performance compared to using explicit redundancy from a convolutional code as it allows to use the maximal rate for the marker bits.

IV. Error Correction Based on Interative Processing

In the following previous error correction results from reference [14] are extended to general Q-ary frequency-shift keying (FSK) modulated asynchronous communication systems and introduce iterative processing at the decoder. Devised in the present inventions was a causal mapping of information and code bits to the symbols of a Q-ary modulation alphabet based on an outer systematic convolutional code and an embedded inner marker code, which protects against symbol insertions and deletions. Shown is that by solely interleaving a short block of parity bits in combination with an iterative decoder a significant iterative gain can be obtained both in terms of symbol error probability and the expected end-to-end distortion between original and reconstructed signals.

A. Asynchronous Sampling

Previous FIG. 9 illustrates how a waveform is uniformly quantized by level-crossing sampling as seen also in reference [15], where $S(t_k)$ denotes the amplitude of the waveform signal at time $t_k$. At each time the waveform is compared with M equally-spaced quantization decision thresholds defined as $$\Delta \triangleq \frac{2\max_i(|S(t)|)}{M}.$$

Whenever the waveform exceeds a decision threshold in the direction of increasing amplitude a "+1" sample is recorded at that specific time, otherwise a "−1" sample is placed; "+1" and "−1" are mapped to bits 1 and 0, respectively. $\tau_{min}$ denotes the smallest possible sampling interval, which is a function of the source waveform signal S(t) and M.

B. System Model-Iterative Decoding

Figure 18:
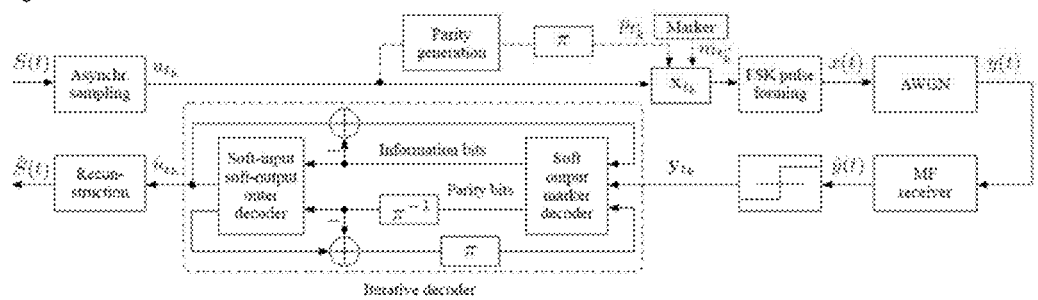
FIG. 18 is a block diagram illustrating a system model of one embodiment of the present invention giving additional detail of FIG. 10.

The system model for the proposed asynchronous communication system is shown in FIG. 18 using information found at reference [14]. The analog signal S(t) is asynchronously sampled into the sample bits $u_{tk}$, k=1; . . . ; T, where T denotes the number of transmitted bits. These bits are assumed to be known at the receiver. If no coding scheme is employed, $u_{tk}$ becomes the length Q vector $x_{tk}$. This vector is modulated by FSK where the carrier pulses are orthogonal sinc waveforms. The length of the pulses is fixed to $\tau_{min}$ in order to avoid intersymbol interference due to overlapping FSK pulses. Encoding generates the corresponding parity bits $p_{t'k}$, which are subsequently permuted by an interleaver ($\pi$) whose interleaving pattern is known to the receiver. Then both interleaved parity and marker bits, used to ensure synchronization, form the redundant bits. These bits are combined with the information bits to generate $x_{tk}$, which is subsequently modulated via Q-ary FSK. Note that not only the value of the sampled bits need to be recovered but also the timing information of the samples $u_{tk}$ must be preserved. This means that systematic codes are required.

Figure 19:
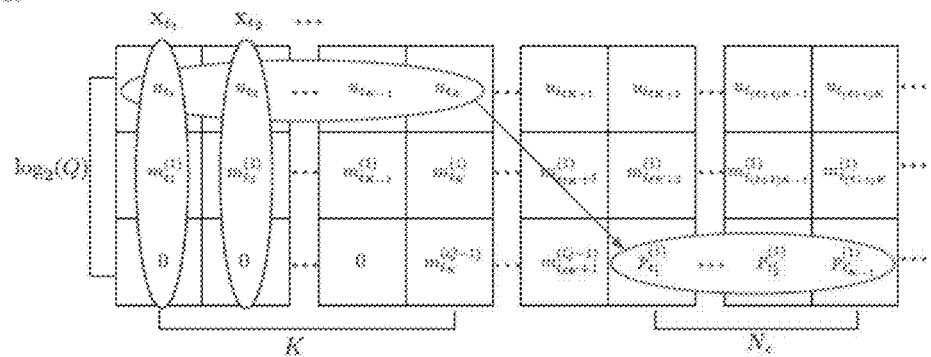
FIG. 19 is a diagram illustrating combination of information and redundant bits for Q-FSK pulse forming.
Figure 20:
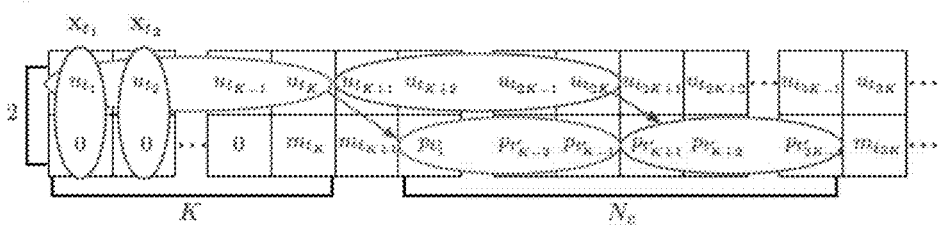
FIG. 20 is a diagram illustrating combination of information and redundant bits for 4-FSK pulse forming.

FIG. 19 shows an example how asynchronously sampled information bits $u_{tk}$, encoded and interleaved parity bits $p_{t'k}$, and periodic marker bits can be arranged to form Q-ary modulation symbols. The first row always contains the information symbols, as it is needed to preserve the timing information. K denotes the block length of uncoded symbols, and $N_c$ represents the number of parity bits in each block. For 4-FSK pulse forming (see FIG. 20), the second row is a combination of parity and marker bits, where a pair of marker bits $M_{t''k}$ and $m_{t'k+1}$ appear at times t'K and t'K+1, '2 N, periodically. $t_{lK}$ and $t_{lK+1}$·l∈N, periodically.

These marker bits are assumed to be known at the decoder and are used to resynchronize the received symbol sequence from deletion and insertion errors. For 8-FSK pulse forming an additional row full of markers is added as it is shown in FIG. 19. Higher order Q-ary FSK pulses can be obtained by adding a larger number of marker and parity bits. Due to causality, the parity bits during the first block of K symbols are set to zeros. Also, note that the parity and information bits in the same symbol $x_{tk}$ can be regarded as independent as they are associated with different code words, which simplifies the computation of the joint probabilities for iterative decoding. Since K is directly related to the memory requirements and the chip area of the sensor, it is required to be not too large. Employed was A systematic convolutional codes whose code rates are $R_c=K=(K+N_c)$. Also, $R_m$ denotes the code rate associated with the marker symbols. Then, the tradeoff between the two code rates is constrained as shown in the below formula (1) in this section:

$$R_c R_m = \frac{1}{\log_2(Q)}. \quad (1)$$

Figure 21:
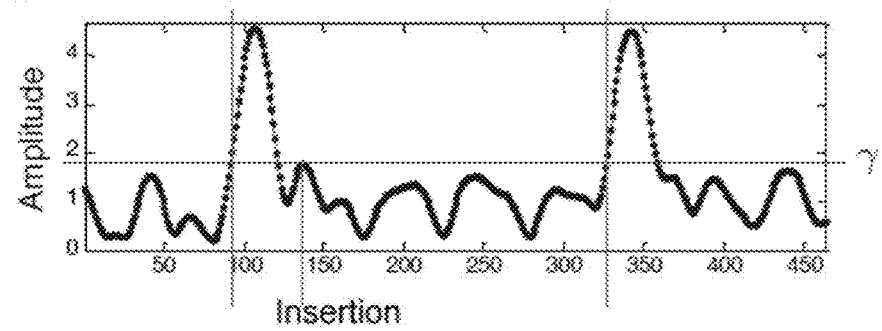
FIG. 21 is a graph illustrating waveform ˆy(t) at the input of the MF in FIG. 18.
Figure 22:
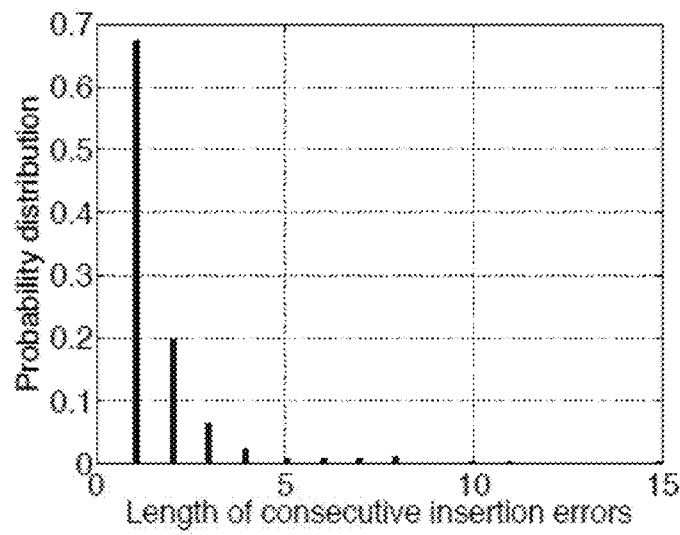
FIG. 22 is a bar graph illustrating length distribution of consecutive insertion errors.

After encoding, the modulated signal x(t) is transmitted over an AWGN channel. The observation at the channel output y(t) is applied to a matched filter (MF) receiver, it is then passed to the iterative channel decoder that ensures resynchronization, for example insertion and deletion error correction, and the correction of substitution errors on the channel, followed by a reconstruction stage. In the MF receiver, the output of the $2^Q$ matched filters is compared with a threshold on a very fine grid, in this example by running a high frequency local clock at the base station, and whenever the threshold is exceeded, the corresponding Q-ary symbol is reconstructed. A deletion error occurs when the energy waveform after the MF lies below a certain threshold γ. In contrast, an insertion takes place when the channel noise triggers the given threshold during a silent segment between two adjacent pulses (see FIG. 21). Since any position during this segment may trigger the threshold when random noise exists, it is possible that there will be more than one insertion between the adjacent pulses, thus creating burst insertion errors. For a 10 ms of segment of continuous-time rat cortex signal FIG. 22 shows the length distribution of consecutive insertion errors at an SNR of 2 dB, where approximately 35% of the insertion errors are burst errors.

C. Error Correction-Symbol Based Forward Backward Algorithm

In reference [10] it was seen that a forward backward algorithm (FBA) for correcting insertion, deletion, and substitution errors for synchronous transmission is introduced. Adapted is this algorithm for purposes as follows, where for simplicity the time $t_k$ is replaced with the integer k as done in the above example. The transmitted bit sequence of length T is defined as $X_1^T = x_1, x_2, \ldots, x_T$), the received bit sequence of length R after channel is $Y_1^R = (y_1, y_2, \ldots, y_R)$, where x and y represent transmitted and received length-Q binary vectors, respectively, corresponding to a specific column in FIG. 19. Both R and T are assumed to be known at the receiver. As in the classical BCJR algorithm [16] again it is defined:

$$\alpha_{k,n} \triangleq P(D_{k,n}, Y_1^n), \text{ and } \beta_{k,n} \triangleq P(Y_{n+1}^R | D_{k,n})$$

where $D_{k,n}$ is defined as the event that when the transmitted number of symbols is k∑{1, 2, ..., T}, and the received number of symbols is n∈{1, 2, ... R}. The symbol based forward recursion using reference [10] is given as in the below formula (2):

$$\alpha_{k,n} = \frac{P_i}{Q^2}\alpha_{k-1,n-2} + P_d \alpha_{k-1,n} + P_t \alpha_{k-1,n-1} \sum_{x_k} P(x_k)(1-P_s)^{\delta_{x_k,y_n}} P_s^{1-\delta_{x_k,y_n}}, \quad (2)$$

where $\delta_{x,y}$ denotes the Kronecker delta. $P_i$, $P_d$ and $P_s$ are insertion, deletion and substitution probabilities, respectively, and $$P_t \triangleq 1 - P_i - P_d \cdot P(x_k)$$

is the a priori probability of the transmitted symbols. At time slot k, $x_k$ contains j uniformly distributed binary non-marker bits $c_k^j = |c_k^j(1), c_k^j(2), \ldots, c_k^j(j)|$, j∈{1, 2, ..., $\log_2(Q)$}, and $\bar{j}$ binary marker bits with fixed values known to the receiver is described as:

$m_k^{\bar{j}} = [m_k^{\bar{j}}(1), m_k^{\bar{j}}(2), \ldots, m_k^{\bar{j}}(\bar{j})]$, $\bar{j} = \log_2(Q) - j$, respectively.

If $x_k$ contains the bits $m_k^{\bar{j}}$, they are determined with probability 1 since the marker bits are assumed to be known at the receiver. Therefore, in above equation (2), the following equation (3) was derived:

$$P\left(x_k = \begin{bmatrix}c_k^j, m_k^{\bar{j}}\end{bmatrix}^T\right) = P(c_k^j) = \prod_{i=1}^{j} P(c_k^j(i)) = \frac{1}{2^j}. \quad (3)$$

For example, in 4-FSK pulse forming, if $x_k$ contains a marker bit 0 and j=1, we have $P(x_k=[00]^T=P(x_k=[10]^T=0:5$. If $x_k$ contains a parity bit and j=2, $P(x_k)=P(c^2_k(1)) P(c^2_k(2))=0:25$.

The recursion for $\beta_{k,n}$ is defined similarly as in formula (2) of this section. Finally, by combining $\alpha_{k,n}$ and $\beta_{k,n}$ (see reference [14] for example) it may be obtained for a soft output of the FBA algorithm $P(Y_1^R|x_k)$, which is used as soft input for the outer SISO decoder.

The obtained results from the inner FBA synchronization decoding are further employed to localize the position of deleted and inserted FSK pulses. The inserted pulses can be removed directly.

Any deleted pulse is placed at the midpoint between two adjacent pulses, which only incurs a small additional average end-to-end distortion (see for example in [14]).

D. Iterative Decoding

In order to combat burst insertion errors, a random interleaver is employed in the proposed scheme. The length of interleaver is kept moderate due to the limited size of the sensor chip storage and given transmission delay constraints. Since the order of the information bits and therefore the timing information must be preserved, and since the markers bits appear periodically and are known to the receiver, only the parity bits are interleaved.

Figure 23:
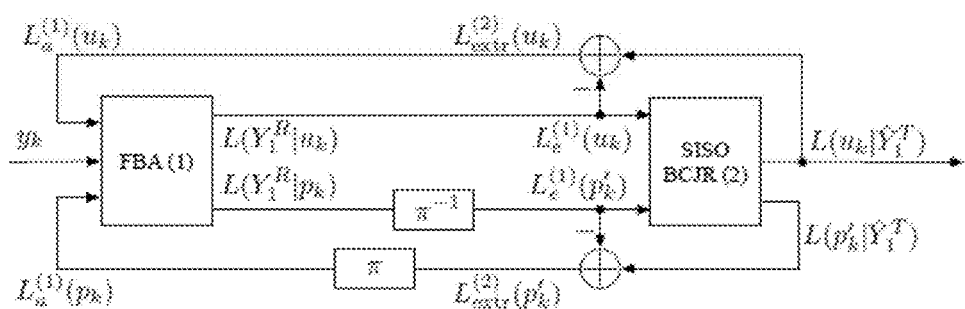
FIG. 23 is a diagram iterative decoding.

In iterative decoding for serially concatenated codes, for example see reference [17], extrinsic information of both information bits and parity bits are computed and exchanged between inner codes and outer codes. In contrast, in the present invention, an exchange of the extrinsic information of both information and parity bits is between inner marker codes and outer convolutional codes. The iterative decoder setup employed in this present invention is shown in FIG. 23. The output L-values of the information bits from the FBA are fed directly to the input of the soft-input soft-output (SISO) BCJR decoder for the outer convolutional code. The output L-values of the parity bits from the FBA are deinterleaved before being processed by the BCJR. The extrinsic information of information bits and parity bits from the BCJR decoder are obtained as shown in the below formulas (4)-(7):

$$L_{extr}^{(2)}(u_k) = L(u_k | \hat{Y}_1^T) - L_e^{(1)}(u_k), \quad (4)$$

$$L_{extr}^{(2)}(p_k') = L(p_k' | \hat{Y}_1^T) - L_e^{(1)}(p_k'), \quad (5)$$

where $$L_e^{(1)}(u_k = 0/1) = \log\frac{P(Y_1^R | u_k = 0/1)}{P(Y_1^R | u_k = 1/0)}, \quad (6)$$

$$L_e^{(1)}(p_k' = 0/1) = \log\frac{P(Y_1^R | p_k' = 0/1)}{P(Y_1^R | p_k' = 1/0)}, \quad (7)$$

which feeds back as a priori information to the input of the FBA to update $P(x_k)$ in above formula (2) of this section. The non-marker symbol is: $c_k^j=[u_k, p_k^{ij-1}]$, where $p_k^{ij-1}=[p_k^{ij-1}(1), p_k^{ij-1}(2), \ldots, p_k^{ij-1}(j-1)]$ is the interleaved parity bit vector. If $x_k$ contains $m_k^j$, then the following formula (8) is:

$$P\left(x_k = [c_k^j, m_k^j]^T\right) = P(u_k) \cdot \prod_{i=1}^{j-1} P(p_k'^{j-1}(i)). \quad (8)$$

For example, in 8-FSK pulse forming, if j=2, for example, the second and third row in FIG. 19 completely consist of marker bits, then $P(x_k=[010]^T=P(u_k=0)$.

If the second row contains parity bits, but the third row contains a marker bit 1, for example, j=2, then $P(x_k=[001]^T)=P(u_k=0) P(p_k'^1 (1)=0)$. The update of $P(x_k)$ for general Q-ary FSK can be obtained in a similar way.

Simulation Results

In this section, a 10 ms excerpt of the above mentioned recorded rat cortex signal was employed to evaluate the proposed error correction strategy. This signal is asynchronously quantized with M=63 threshold levels. The periodic pair of marker bits is fixed as $[m_{j_K}, m_{j_{K+1}}]=[0; 1]$. In the Table shown in FIG. 26 illustrated is employed outer convolutional codes for different values of $N_c$ along with the corresponding mother code rates R, punctured rates $R_c$, and code rates with the markers $R_m$. In order to preserve the timing information of the pulses, only parity bits are punctured. Also, the puncturing patterns are selected such that the combined deletion, insertion, and substitution error probabilities are minimized. Although only the performances for 2-FSK, 4-FSK, and 8-FSK modulation are compared herein to demonstrate the principles of the invention, it is within the scope of this invention to utilize other modulations.

Figure 24:
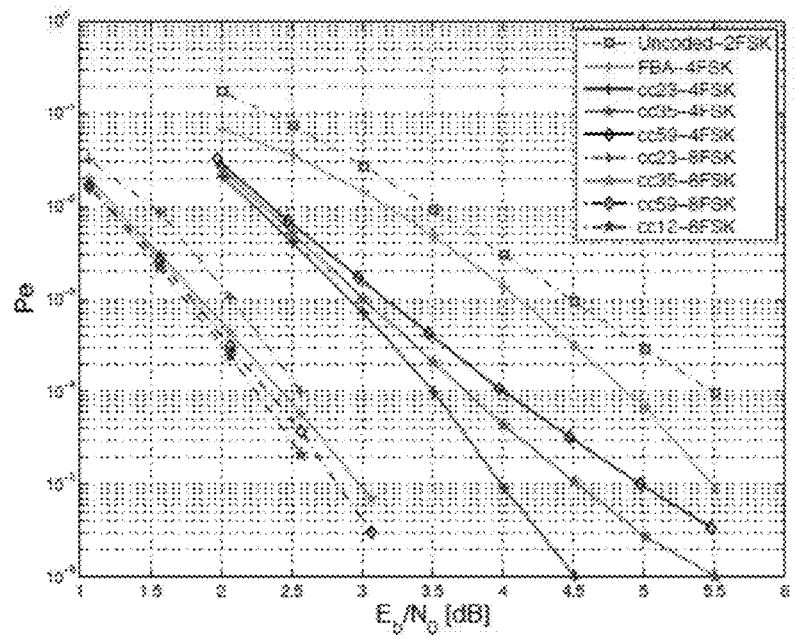
FIG. 24 is a graph illustrating error probability for different codes displayed in FIG. 26 under different FSK modulation.

In FIG. 24, compared is the symbol error probability of different systematic convolutional codes displayed in the Table as shown in FIG. 26 under 4-FSK and 8-FSK modulation. FIG. 24 shows that a smaller $R_m$, for example, a larger number of marker bits under 4-FSK modulation, leads to a smaller error probability. The reason is that even though reducing $R_m$ will lead to an increase of the code rate of the employed convolutional code according to (1) which cleans up a smaller number of residual errors after insertion/deletion decoding, it provides a better protection for information bits from insertion/deletion errors. However, for 8-FSK modulation, a smaller $R_c$ provides a better overall error correcting performance. This is due to the fact that the third row of the pulse forming scheme in FIG. 19 only consist of markers, which already provides sufficient protection for the information bits from synchronization errors. Therefore, the overall error correcting performance gain for 8-FSK is dominated by convolutional codes with lower code rates.

Figure 25:
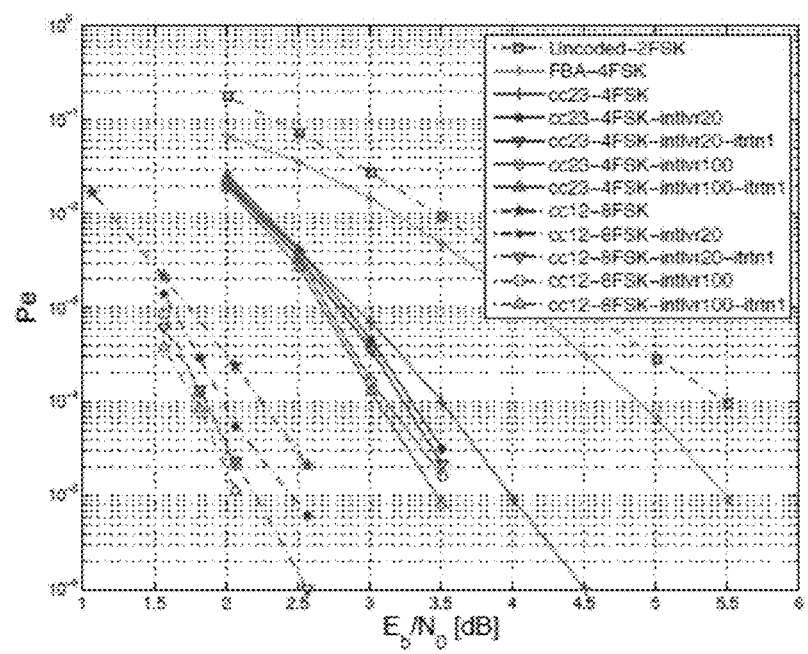
FIG. 25 is a graph illustrating iterative decoding performance for different interleaver sizes under different FSK modulation.

FIG. 25 compares the iterative decoding performance for different outer convolutional codes and interleaver sizes of 20 and 100, respectively, for both 4-FSK and 8-FSK modulation. Convolutional codes with the best overall error correcting performance under 4-FSK and 8-FSK in FIG. 24 are investigated, respectively. The overall performance for 8-FSK improves on 4-FSK because a larger amount of redundancy is employed. Also seen is that a moderate increase of the interleaver size from 20 to 100 improves the error correcting performance as burst insertions are dispersed to a larger extent. Due to the small interleaver size, only one decoding iteration is employed. Observed was diminishing gains in further iterations.

FIG. 27 shows the expected end-to-end MSE distortion versus the SNR, where similar observations as in FIGS. 24 and 25 can be made. In contrast to FIGS. 24 and 25 the distortion includes errors due to incorrect localization of the position of inserted and deleted pulses. Again, it can be seen that employing iterative decoding along with interleaving of parity bits also reduces the distortion.

In conclusion, the above example scheme comprises a combination of a systematic outer convolutional code and an embedded inner marker code at the sensor node. Simulation results have shown that using 8-FSK modulation symbols provides a performance gain of over 1 dB in SNR compared to 4-FSK. If the number of marker bits is not large enough to protect every information bit, for example not all transmitted FSK symbols contain marker bits for 4-FSK, increasing the number of marker bits provides a better error correcting performance and a smaller end-to-end distortion. In contrast, if a sufficient number of marker bits are already employed, for example every transmitted FSK symbol contains a marker bit as in the proposed 8-FSK scheme; the overall performance is dominated by convolutional codes with lower code rates. Also, iterative decoding with a small number of iterations in combination with interleaving the parity bits further reduces both the number of residual substitution errors and the end to-end distortion.

Medical and Other Applications

The invention described herein may be utilized in many fields where ultra-low power sensors are desirable. One field is in the area of medical sensors. Improvement in health of patients may be obtained with ultra-low-power wearable medical devices utilizing the principles described herein.

In a healthcare system, sensing and sending medical data requires significant resources (both in equipment and manpower). Wireless wearable medical devices provide a solution to alleviate this problem, as they are able to sense and transmit biomedical signals. Current wireless wearable medical devices are limited by battery lifetime (energy). The disclosed technology herein solves these bottleneck problems by drastically extending sensor lifetime that will enable a next generation of medical sensory devices. The technology disclosed herein focuses on reducing circuit power consumption and extending battery lifetime that may be applied to, for example, wearable devices that will enable low power real time signal processing applications.

Depending on the embodiments, the technology of the present invention may be utilized in low-power biomedical data acquisition systems. Potential application scenarios includes, but are not limited to, assisted living facilities, wearable seizure detectors, electrocardiogram (ECG) waveform analyzers for preventing heart attacks, and the like.

The present invention provides an extremely low complexity sensor hardware technology based on asynchronous communication, which consumes significantly less power than currently used sensor devices and thus allows for a significantly larger battery lifetime. This inventive technology is suitable for example in a plethora of sensing applications including, but not limited to, sensors for health care, fitness, surveillance, smart buildings, disaster mitigation, and environment monitoring, where sensor locations may be hard to access and therefore replacing the battery may be costly and time-consuming. Typically, such applications require extremely power efficient integrated sensors capable of providing reliable wireless links under low circuit complexity, long battery life, low overall system costs, and a small sensor footprint. All these criteria are fulfilled by utilizing the technology of the present invention.

Compared to conventional sensor architecture which samples the measured signal in regular small time intervals, the present invention architecture samples the sensed signal and transmits these samples only if changes occur in the signal waveform. Therefore, the present invention's hardware requires a smaller number of transmissions compared to conventional schemes to convey the same amount of information. Depending on the sampled signal, the reduction in the number of transmissions can be up to 78.5%. Second, a hardware clock circuit does not need to be present at the sensor in contrast to conventional designs which alone leads to a power reduction of over 80%.

The present invention's technology may have extended signal range by requiring lower power than standard devices. It is also within the scope of this invention to implement an interaction with wireless protocols as Bluetooth that allows a device using the present invention's technology to interact directly with smartphone applications.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCES

[1] J. Foerster, E. Green, S. Somayazulu, and D. Leeper, "Ultra-wideband technology for short- or medium-range wireless communications," Intel Technology Journal, vol. 5, no. 2, pp. 1-11, May 2001.

[2] A. Willig, "Recent and emerging topics in wireless industrial communications: A selection," IEEE Transactions on Industrial Informatics, vol. 4, no. 2, pp. 102-124, May 2008.

[3] V. C. Gungor and G. P. Hancke, "Industrial wireless sensor networks: Challenges, design principles, and technical approaches," IEEE Trans. On Industrial Electronics, vol. 56, no. 10, pp. 4258-4265, October 2009.

[4] J. A. Tropp, J. N. Laska, M. F. Duarte, J. K. Romberg, and R. G. Baraniuk, "Beyond Nyquist: Efficient sampling of sparse bandlimited signals," IEEE Trans. Inf. Theory, vol. 56, no. 1, pp. 520-544, 2010.

[5] B. Schell and Y. Tsividis, "A continuous-time ADC/DSP/DAC system with no clock and with activity-dependent power dissipation," IEEE Journ. of Solid-State Circ., vol. 43, no. 11, pp. 2472-2481, November 2008.

[6] Q. Hu, C. Yi, J. Kliewer, and W. Tang, "Asynchonous communication for wireless sensors using ultra-wideband impulse radio," in IEEE $58^{th}$ International Midwest Symposium on Circuits and Systems, Fort Collins, Colo., August 2015, pp. 1-4.

[7] N. J. A. Sloane, "On single-deletion-correction codes," in Codes and Designs. Berlin: Walter de Gruyter, May 2000, pp. 273-291.

[8] M. C. Davey and D. J. C. MacKay, "Reliable communication over channels with insertions, deletions, and substitutions," IEEE Trans. Inf. Theory, vol. 47, no. 2, pp. 687-698, February 2001.

[9] J. Chen, M. Mitzenmacher, C. Ng, and N. Varnica, "Concatenated codes for deletion channels," in Proc. IEEE Int. Sympos. on Inform. Theory, Yokohama, Japan, June 2003, pp. 218-218.

[10] F. Wang, D. Fertonani, and T. M. Duman, "Symbol-level synchronization and LDPC code design for insertion/deletion channels," IEEE Trans. Comm, vol. 59, no. 5, pp. 1287-1297, May 2011.

[11] F. Wang, D. Aktas, and T. M. Duman, "On capacity and coding for segmented deletion channels," in Proc. 49th Annual Allerton Conference on Communication, Control, and Computing, Monticello, Ill., September 2011, pp. 1408-1413.

[12] M. F. Mansour and A. H. Tewfik, "Convolutional decoding in the presence of synchronization errors," IEEE J. Sel. Areas in Commun., vol. 28, no. 3, pp. 218-227, February 2010.

[13] H. Mercier and V. K. Bhargava, "Convolutional codes for channels with deletion errors," in Proc. 11th Canadian Workshop on Information Theory, 2009, May 2009, pp. 136-139.

[14] C. Yi and J. Kliewer, "Error correction for asynchronous communication," in IEEE 9th International Symposium on Turbo Codes and Iterative Information Processing (ISTC), Brest, France, September, 2016, pp. 310-314.

[15] L. F. Chaparro, E. Sejdic, A. Can, O. A. Alkishriwo, S. Senay, and A. Akan, "Asynchronous representation and processing of nonstationary signals: A time-frequency framework," IEEE Signal Processing Magazine, vol. 30, no. 6, pp. 42-52, 2013.

[16] L. R. Bahl, J. Cocke, F. Jelinek, and J. Raviv, "Optimal decoding of linear codes for minimizing symbol error rate," IEEE Trans. Inf. Theory, vol. 20, no. 2, pp. 284-287, March 1974.

[17] S. Benedetto, D. Divsalar, G. Montorsi, and F. Pollara, "Serial concatenation of interleaved codes: Performance analysis, design, and iterative decoding," IEEE Transactions on information Theory, vol. 44, no. 3, pp. 909-926, 1998.

What is claimed is:

1. A method of asynchronous wireless sensing, comprising:
utilizing a forward error correction scheme for asynchronous sensor communication, wherein dominant errors consist of pulse deletions and insertions, and encoding is instantaneous;
combining a systematic convolutional code, an embedded marker code, and a power-efficient frequency shift keying (FSK) modulation at a sensor node;
obtaining decoding via a maximum a-posteriori (MAP) decoder for the marker code to achieve synchronization for an insertion and deletion channel; and then MAP decoding for the convolutional code;
wherein, effective data rate and energy efficiency are improved and bit-error-rate (BER) and electromagnetic noise emissions are reduced.

2. The method of claim 1, further includes utilizing both a residual redundancy in asynchronously sampled and a quantized source signal with redundancy only from the marker code to provide a low complexity for deletion and insertion error correction compared to using explicit redundancy.

3. The method of claim 1, wherein the forward error correction scheme for asynchronous sensor communication is accomplished where a continuous-time sparse waveform signal is asynchronously sampled and communicated over a noisy channel via Q-ary frequency-shift keying.

4. The method of claim 3, further includes employing a presented concatenated code with outer systematic convolutional codes and inner embedded marker codes for effective preservation of timing information and protection against symbol insertions and deletions.

5. The method of claim 1, further includes iteratively decoding the marker and the convolutional codes along with interleaving a short block of parity bits for reducing expected end-to-end distortion between original and reconstructed signals as compared to non-iterative processing.

6. The method of claim 1, further includes
using ultra-wideband impulse radio with FSK-OOK modulation;
forming a complete asynchronous wireless sensing architecture that eliminates a need for clock circuitry in a transmitter; and
combining asynchronous sensing and asynchronous wireless communications.

7. The method of claim 6, wherein the asynchronous communication is an uncoded asynchronous communication, a coded asynchronous communication, or both the uncoded and the coded asynchronous communication.

8. The method of claim 7, wherein the coded asynchronous communication utilizes error correction.

9. The method of claim 6, further includes:
incorporating a front-end asynchronous signal interface and a backend asynchronous wireless interface, and
wherein, the front-end asynchronous signal interface converts an input analog signal into two asynchronous digital pulse streams.

10. The method of claim 9, further including,
predefining in the signal interface two thresholds as a reference window boundaries; and
comparing an input signal with the boundaries and when the input signal exceeds either of the thresholds an output pulse is generated indicating whether the signal is higher or lower than the thresholds.

11. The method of claim 10, further including shifting the reference window up or down by a predefined step to prepare a next sampling event, and having generated positive and negative pulse streams output of the asynchronous signal interface.

12. The method of claim 9, wherein the asynchronous wireless interface further includes two separate transmitters with FSK (frequency-shift-keying)-OOK (on-off-keying) modulation for sending positive and negative pulses.

13. The method of claim 12, wherein each transmitter further includes a voltage controlled ring oscillator with an input stage, a multiplexer chain, and a power amplifier, and wherein a frequency of the ring oscillator is digitally controlled.

14. The method of claim 12, wherein baseband data is sent to an input stage that performs OOK modulation.

15. The method of claim 13, wherein the ring oscillator generates RF (radio-frequency) carriers and the frequency of the RF carrier is controlled by the multiplexer chain that performs FSK.

16. The method of claim 15, wherein an RF impulse is delivered to a power amplifier that drives a transmitter antenna and a receiver collects timing information of the received positive and negative pulse streams and recovers an original input signal.

17. The method of claim 16, further including utilizing an asynchronous integrated Ultra-Wideband (UWB) impulse radio transmitter and receiver suitable for low-power miniaturized wireless sensors.

18. The method of claim 17, wherein low peak power consumption for the transmitter is about 10.8 mW and for the receiver is about 5.4 mW.

19. The method of claim 17, wherein the measured maximum baseband data rate of the radio is about 2.3 Mb/s.

20. An asynchronous integrated Ultra-Wideband (UWB) impulse radio transmitter and receiver suitable for low-power miniaturized wireless sensors, comprising:
at least one processor;
a memory communicatively coupled to the at least one processor; and wherein the at least one processor is configured to:
instruct a front-end asynchronous signal interface to convert an input analog signal into two asynchronous digital pulse streams;
compare an input signal against window boundaries wherein the signal interface has two thresholds predefined as the boundaries of a reference window;
instruct generation of an output pulse when the input signal exceeds either of the boundaries, wherein the generated output pulse indicates whether the input signal is higher or lower than the thresholds;

shift the reference window up or down by a predefined step to prepare for a next sampling event;

transmit a plurality of positive and negative pulses from the asynchronous signal interface by utilizing two separate transmitters with FSK(frequency-shift-keying)-OOK (on-off-keying) modulation, wherein each transmitter consists of a ring oscillator with an input stage, a multiplexer chain, and a power amplifier;

transmit baseband data to an input stage for performing OOK;

instruct the ring oscillator to generates RF (radio-frequency) carriers, wherein the frequency of the RF carrier is controlled by the multiplexer chain that performs FSK;

instruct delivery of a RF impulse to a power amplifier that drives a transmitter antenna; and instruct a receiver to collect timing information of received positive and negative pulse streams and recover an original input signal.

21. The device of claim 20, wherein the at least one processor is further configured for low power always-on wireless sensors with sparse input signals.

22. A non-transitory computer readable medium storing computer executable code, comprising code for:

instructing a front-end asynchronous signal interface to convert an input analog signal into two asynchronous digital pulse streams;

comparing an input signal against window boundaries wherein the signal interface has two thresholds predefined as the boundaries of a reference window;

instructing generation of an output pulse when the input signal exceeds either of the boundaries, wherein the generated output pulse indicates whether the input signal is higher or lower than the thresholds;

shifting the reference window up or down by a predefined step to prepare for a next sampling event;

transmitting a plurality of positive and negative pulses from the asynchronous signal interface by utilizing two separate transmitters with FSK(frequency-shift-keying)-OOK (on-off-keying) modulation, wherein each transmitter consists of a ring oscillator with an input stage, a multiplexer chain, and a power amplifier;

transmitting baseband data to an input stage for performing OOK;

instructing the ring oscillator to generates RF (radio-frequency) carriers, wherein the frequency of the RF carrier is controlled by the multiplexer chain that performs FSK;

instructing delivery of a RF impulse to a power amplifier that drives a transmitter antenna; and instructing a receiver to collect timing information of received positive and negative pulse streams and recover an original input signal.

* * * * *